United States Patent
Nandavanam et al.

(10) Patent No.: US 12,093,745 B2
(45) Date of Patent: Sep. 17, 2024

(54) SYSTEMS AND METHODS FOR MANAGING RESOURCES IN A VIRTUAL DESKTOP INFRASTRUCTURE

(71) Applicant: International Business Machines Corporation, Armonk, NY (US)

(72) Inventors: Vivek Nandavanam, New York, NY (US); Shravan Sriram, Secaucus, NJ (US); Jerrold Leichter, Stamford, CT (US); Alexander Nish, Boston, MA (US); Apostolos Dailianas, Athens (GR); Dmitry Illichev, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 450 days.

(21) Appl. No.: 17/007,807

(22) Filed: Aug. 31, 2020

(65) Prior Publication Data
US 2022/0156124 A1    May 19, 2022

(51) Int. Cl.
*G06F 9/451* (2018.01)
*G06F 9/50* (2006.01)

(52) U.S. Cl.
CPC ............ *G06F 9/5077* (2013.01); *G06F 9/452* (2018.02)

(58) Field of Classification Search
CPC ............................... G06F 9/5077; G06F 9/452
See application file for complete search history.

(56) References Cited

U.S. PATENT DOCUMENTS

| | | | |
|---|---|---|---|
| 9,900,264 B1* | 2/2018 | Chen | G06N 7/00 |
| 10,754,696 B1* | 8/2020 | Chinnam | G06F 11/1453 |
| 10,917,471 B1* | 2/2021 | Karumbunathan | H04L 67/1097 |
| 2010/0070978 A1* | 3/2010 | Chawla | G06F 9/5077 718/105 |
| 2012/0089980 A1* | 4/2012 | Sharp | G06F 3/0481 718/1 |
| 2012/0311154 A1* | 12/2012 | Morgan | G06F 9/5072 709/226 |
| 2013/0080641 A1* | 3/2013 | Lui | H04L 43/065 709/226 |
| 2014/0137110 A1* | 5/2014 | Engle | G06F 9/5022 718/1 |
| 2014/0307640 A1* | 10/2014 | Agrawal | H04W 72/0493 370/329 |
| 2014/0344810 A1* | 11/2014 | Wang | G06F 9/5072 718/1 |
| 2015/0242234 A1* | 8/2015 | Harris | G06F 9/4843 718/1 |
| 2016/0041837 A1* | 2/2016 | Rangayya | H04L 41/0843 718/1 |

(Continued)

*Primary Examiner* — Emerson C Puente
*Assistant Examiner* — Jonathan R Labud
(74) *Attorney, Agent, or Firm* — Stosch Sabo

(57) ABSTRACT

Various approaches for managing one or more computational commodities in a virtual desktop infrastructure (VDI) include receiving a collection of utilization records for a user utilizing a desktop resource supported by the computational commodity in a desktop pool, each utilization record corresponding to a utilization rate of the computational commodity by the user; and augmenting or reducing allocation of the computational commodity to the desktop resource utilized by the user based at least in part on the utilization rates.

32 Claims, 13 Drawing Sheets

(56) References Cited

U.S. PATENT DOCUMENTS

| | | | | |
|---|---|---|---|---|
| 2016/0164797 A1* | 6/2016 | Reque | ............... | G06F 9/45533 |
| | | | | 718/1 |
| 2016/0182399 A1* | 6/2016 | Zadka | ................. | H04L 47/726 |
| | | | | 709/226 |
| 2017/0257303 A1* | 9/2017 | Boyapalle | ........... | H04L 67/1001 |
| 2018/0295033 A1* | 10/2018 | Vladimirskiy | ...... | H04L 41/0895 |
| 2019/0213027 A1* | 7/2019 | Bhandari | ............... | G06F 9/505 |
| 2021/0026679 A1* | 1/2021 | Sulcer | ............... | G06F 9/45558 |
| 2021/0103644 A1* | 4/2021 | Madishetti | ............ | G06F 9/452 |

\* cited by examiner

SYSTEMS AND METHODS FOR MANAGING RESOURCES IN A VIRTUAL DESKTOP INFRASTRUCTURE

FIELD OF THE INVENTION

The present invention relates, generally, to virtual desktop infrastructure (VDI), and more particularly to systems and methods for managing computational resources in VDI.

BACKGROUND

Increasingly, organizations (e.g., corporations, universities, etc.) are moving away from traditional stand-alone desktop computers in favor of "virtual desktop infrastructure" (VDI)—i.e., the use of computer virtualization technology to provide centrally managed desktop functionality to users via the Internet or a local network. More specifically, computer functionality and applications are emulated at one or more central servers, which provide the "virtual" desktop content that a remote user sees on his or her screen; though applications execute centrally, the user's experience is largely indistinguishable from running the same applications locally. The VDI software emulation of a computer is referred to as a "virtual machine" (VM). When users work from their client devices, all of the programs, applications, processes, and data are stored and run centrally, allowing users to access their desktops on any capable device, such as a traditional personal computer, laptop computer, smartphone, thin client, etc. This arrangement provides an organization with control over application versions, user access to data, implementation of security policies, and session auditability. The user need not store or update applications or large databases locally and can easily transition among different client devices, even within a session.

VDI can create a large number of independent desktops for a large number of users. The desktops are grouped together in desktop pools that may be provisioned, managed, and deleted as single entities. Typically, each desktop pool is assigned to multiple users, and upon receiving a request from a user, a desktop is exported to the user from the VM in the assigned desktop pool. Conventionally, the desktop pools are assigned to the users randomly or based on their geographic locations. But because the amount of computational resources in each desktop pool is fixed, an over-allocation or under-allocation of resources to the users may occur. For example, over-allocation may occur when a large number of users in the same assigned desktop pool request use of the desktops at the same time or one or more users in the same assigned desktop pool request or require a large share of computational resources. Under-allocation may occur when, for example, the amount of computational resources for supporting the desktops requested by the users is much smaller than that allocated to the desktop pool. Over-allocation may result in congestion in the desktop pool and under-allocation may result in inefficient use of the computational resources.

Accordingly, a need exists for resource management such that desktop pools (and the computational resources associated therewith) are efficiently allocated to users without over-allocation or under-allocation, thereby ensuring optimal performance of the VDI.

SUMMARY

The present invention relates to approaches for assigning desktop pools (and thereby allocating the computational resources associated therewith) to the users based on predicted users' demands on the computational resources, thereby avoiding over-allocation or under-allocation of the computational resources. In various embodiments, the users' demands on the computational resources are predicted based on the users' utilization records of the computational resources. For example, a resource-management system may collect and/or sample the records to determine a utilization rate at or above a designated percentile (e.g., $95^{th}$ percentile) (or, in some embodiments, at or above the average utilization rate of the collected/sampled records). Based thereon, the size(s) of the computational resource(s) that may be demanded by the user when requesting the desktop resource can be predicted. Based on the predicted size(s) of the computational resource(s), the resource-management system may select a desktop pool that can provide the demanded size(s) of the computational resource(s) and allocate the resource(s) from the selected desktop pool to the VM assigned to the user for providing the virtual desktop resource. In some situations, the desktop pool currently assigned to the user is congested (e.g., having a resource utilization rate larger than the target utilization rate such as 70%); the resource-management system may select a new desktop pool that has excess capacity to provide the computational resource(s) demanded by the user without causing congestion therein, and subsequently, migrate the VM assigned to the user from the congested desktop pool to the newly selected desktop pool for alleviating pressure on the congested desktop pool.

In some embodiments, based on the user's utilization records, the resource-management system can learn a user-specific utilization pattern of the computational resource(s) for supporting the requested desktop resource. In one embodiment, the utilization pattern is analyzed on a "time-slot" basis to predict the user's demand on the resource(s) in each time slot of a day. In addition, based on the utilization patterns of the users assigned in the same desktop pool, the utilization rate(s) or utilization size(s) of the computational resource(s) associated with each desktop pool in each time slot can be predicted. Based on the predicted user's demand on the computational resource(s) and the current or predicted utilization rate(s)/size(s) of the computational resource(s) in each desktop pool, a desktop pool that can provide the demanded computational resource(s) without causing congestion can be selected. Subsequently, the resource(s) may be allocated from the selected desktop pool to the VM assigned to the user for providing the virtual desktop resource. Allocation of the resource(s) based on the time-slot analysis may advantageously provide flexibility to select the desktop pool to optimally fit the user's demand on the computational resource(s).

In some embodiments, more than one desktop pool has excess capacity to provide the demanded computational resource(s); a "squared reciprocal price function" can be implemented to allow selection of the desktop pool that provides the available resource(s) closest to the predicted user's demand. In addition, the learned utilization patterns in each of the time slots may be classified based on their geographic regions; selection of the desktop pools may then be performed based on the learned utilization patterns that are classified in the same region as the user requesting the desktop resource.

In various embodiments, the resource-management system scales up or down the computational resources in the VDI environment based on the resource utilization rates in the desktop pools. For example, if more than a predetermined number (e.g., 10) of the desktop pools in the VDI environment has a utilization rate exceeding a target utilization rate (e.g., 70%), the resource-management system may clone or provision one or more desktop pools to provide additional computational resource(s). Conversely, if more than a predetermined number (e.g., 10) of the desktop pools in the VDI environment has a utilization rate much smaller (e.g., by a factor of ten) than the target utilization rate, the resource-management system may suspend or terminate one or more desktop pools.

In various embodiments, selection of the desktop pool(s) to be cloned/provisioned or suspended/terminated may be based on the revenues and/or expenses associated with the desktop pools. In such embodiments, computational resources are represented in econometric terms, e.g., in terms of the value to a consumer of the resources and the attributable cost to a host of providing them. Value and cost may be defined in a manner appropriate to a deployment and management priorities; value and cost may, for example, be expressed in terms of a real or virtual currency, with the consumer providing "revenue" to a provider, with the attributable cost treated as an "expense." It should be emphasized that revenue and expense need not reflect actual monetary expenditures and realizations. The expense, for example, of providing resources may indeed reflect actual marginal cost and a share of overhead, but may also (or alternatively) reflect traditionally nonmonetary considerations such as load balancing and the ability to sustain quality-of-service commitments to other consumers. Revenue—i.e., the "purchase" of resources—may reflect commitment of a portion of the value that the business ascribes to a particular workload, which may have an associated "budget," rather than an actual payment of money. For management purposes, however, it is often convenient to "book" resource deployments in terms of revenue transfers (e.g., from an application or workload to a host) and incurred expenses to ensure that those deployments reflect greatest overall efficiency and to assess when to commit new physical resources. The more the concepts of attributed revenue and expense map to real-world value and cost, the more economic justification will underlie physical procurement decisions.

In addition, the revenue and expense may continuously change to reflect the utilization rate of the computational resources (e.g., a processor, memory, network, storage). For example, the price offered by a computational resource provider may monotonically increase with a growing utilization rate of the resource. Because the revenue is determined by multiplying the offered price with the utilized quantity of the resource, the revenue may increase as the utilization rate (and thereby the price) of the resource grows. Similar situations may apply to the expense as well.

The revenue and/or expense for each desktop pool providing the computational resource(s) in the VDI environment may be continuously monitored. If the expense for a desktop pool is larger than the revenue by a predetermined factor (e.g., two times, five times or ten times), the desktop pool may be suspended or terminated. Conversely, if the revenue for a desktop pool is larger than the expense by the predetermined factor, the desktop pool may be cloned.

Accordingly, in one aspect, the invention pertains to a method of managing one or more computational resources in a VDI having multiple desktop pools. In various embodiments, the method includes receiving a collection of utilization records for a user utilizing a desktop resource supported by the computational resource(s) in the first one of the desktop pools, each utilization record corresponding to a utilization rate of the computational resource(s) by the user; and augmenting or reducing an allocation of the computational resource(s) to the desktop resource utilized by the user based at least in part on the utilization rates. In one implementation, the method further includes organizing the collected utilization records into percentiles and determining therefrom the utilization rate at or above a designated percentile (e.g., the 95th percentile); and augmenting or reducing the allocation of the computational resource(s) to the desktop resource utilized by the user based at least in part on the utilization rate at or above the designated percentile.

In addition, the method may include computing a target size of the computational resource(s) supporting the desktop resource for the user based at least in part on the utilization rate at or above the designated percentile; and determining whether to augment or reduce the allocation based on the target size. In one embodiment, the method further includes computing the target size of the computational resource(s) based at least in part on a target utilization rate set by the user. Each of the desktop pools may be supported by an allocation of the computational resource(s); the method may further include comparing the allocation of the computational resource(s) supporting the first one of the desktop pools to the target size; and determining whether to augment or reduce the allocation of the computational resource(s) based on the comparison.

In various embodiments, the method further includes, upon determining that the allocation of the computational resource(s) supporting the first one of the desktop pools is smaller than the target size, selecting the second one of the desktop pools; and causing the user to utilize the desktop resource supported by the computational resource(s) in the selected second one of the desktop pools. The allocation of the computational resource(s) supporting the selected second one of the desktop pools is larger than the target size. In addition, the selected second one of the desktop pools may be supported by the smallest allocation of the computational resource(s) among the desktop pools that are supported by the allocations of the computational resource(s) larger than the target size. In some embodiments, each of the desktop pools offers a price for providing the computational resource(s) to support the desktop resource; the price offered by the selected second one of the desktop pools is the smallest among the plurality of desktop pools that provide the at least one computational resource larger than the target size.

In addition, the method may further include, upon determining that the allocation of the computational resource(s) supporting the first one of the desktop pools is larger than the target size, selecting the second one of the desktop pools; and causing the user to utilize the desktop resource supported by the computational resource(s) in the selected second one of the desktop pools. In one implementation, the allocation of the computational resource(s) supporting the selected second one of the desktop pools is larger than the target size but smaller than the allocation of the computational resource(s) supporting the first one of the desktop pools. In one embodiment, the selected second one of the desktop pools is supported by the smallest allocation of the computational resource(s) among the desktop pools that are supported by the allocations of the computational resource(s) larger than the target size. Further, each of the desktop pools may offer a price for providing the computational resource(s) to support the desktop resource; the price offered by the selected second one of the desktop pools is the smallest among the plurality of desktop pools that provide the at least one computational resource larger than the target size.

The computational resource(s) may include a CPU, memory and/or storage supporting the desktop resource. In addition, the allocation of the computational resource(s) to the desktop resource may be augmented or reduced based at least in part on the utilization rate at or above an average utilization rate. In some embodiments, the method further includes, upon determining that more than a predetermined number of the desktop pools have utilization rates exceeding a first predetermined threshold, scaling up the desktop pools in the VDI. In addition, the method may further include selecting (i) one or more existing desktop pools to be cloned or (ii) one or more new desktop pools to be provisioned for additionally allocating the computational resource(s); and cloning the selected existing desktop pool(s) and/or provisioning the selected new desktop pool(s).

In various embodiments, the method further includes determining a revenue and/or an expense associated with each of the existing desktop pools and/or the new desktop pool(s); and selecting the existing desktop pool(s) to be cloned and/or the new desktop pool(s) to be provisioned based at least in part on the associated revenue(s) and/or expense(s). The revenue(s) of the selected existing desktop pool(s) to be cloned and/or the selected new desktop pool(s) to be provisioned may be larger than the expense(s) thereof by a predetermined factor. In addition, the method may further include resizing a viewpod in the VDI to provide one or more additional desktop pools. In one embodiment, the method further includes, upon determining that more than a predetermined number of the desktop pools have utilization rates below the second predetermined threshold, scaling down the desktop pools in the VDI. In addition, the method may further includes selecting one or more existing desktop pools to be suspended or terminated; and suspending or terminating the selected existing desktop pool(s). In one implementation, the expense(s) of the selected existing desktop pool(s) to be suspended or terminated is larger than the revenue(s) thereof by a predetermined factor.

In another aspect, the invention relates to a computer system for managing one or more computational resources in a VDI having multiple desktop pools. In various embodiments, the computer system includes a management system configured to receive a collection of utilization records for a user utilizing a desktop resource supported by the computational resource(s) in the first one of the desktop pools, each utilization record corresponding to a utilization rate of the computational resource(s) by the user; and augment or reduce an allocation of the computational resource(s) to the desktop resource utilized by the user based at least in part on the utilization rates. In one implementation, the management system is further configured to organize the collected utilization records into percentiles and determining therefrom the utilization rate at or above a designated percentile (e.g., the 95th percentile); and augment or reduce the allocation of the computational resource(s) to the desktop resource utilized by the user based at least in part on the utilization rate at or above the designated percentile.

In addition, the management system may be further configured to compute a target size of the computational resource(s) supporting the desktop resource for the user based at least in part on the utilization rate at or above the designated percentile; and determine whether to augment or reduce the allocation based on the target size. In one embodiment, the management system is further configured to compute the target size of the computational resource(s) based at least in part on a target utilization rate set by the user. Each of the plurality of desktop pools may be supported by an allocation of the computational resource(s), and the management system may be further configured to compare the allocation of the computational resource(s) supporting the first one of the desktop pools to the target size; and determine whether to augment or reduce the allocation of the computational resource(s) based on the comparison.

In various embodiments, the management system is further configured to upon determining that the allocation of the computational resource(s) supporting the first one of the desktop pools is smaller than the target size, select the second one of the desktop pools; and cause the user to utilize the desktop resource supported by the computational resource(s) in the selected second one of the desktop pools; the allocation of the computational resource(s) supporting the selected second one of the desktop pools is larger than the target size. In addition, the selected second one of the desktop pools may be supported by the smallest allocation of the computational resource(s) among the desktop pools that are supported by the allocations of the computational resource(s) larger than the target size. In some embodiments, each of the desktop pools offers a price for providing the computational resource(s) to support the desktop resource; the price offered by the selected second one of the desktop pools is the smallest among the plurality of desktop pools that provide the at least one computational resource larger than the target size.

In addition, the management system may be further configured to, upon determining that the allocation of the computational resource(s) supporting the first one of the desktop pools is larger than the target size, select the second one of the desktop pools; and cause the user to utilize the desktop resource supported by the computational resource(s) in the selected second one of the desktop pools. In one implementation, the allocation of the computational resource(s) supporting the selected second one of the desktop pools is larger than the target size but smaller than the allocation of the computational resource(s) supporting the first one of the desktop pools. In one embodiment, the selected second one of the desktop pools is supported by the smallest allocation of the computational resource(s) among the desktop pools that are supported by the allocations of the computational resource(s) larger than the target size. Further, each of the desktop pools may offer a price for providing the computational resource(s) to support the desktop resource; the price offered by the selected second one of the desktop pools is the smallest among the plurality of desktop pools that provide the at least one computational resource larger than the target size.

The computational resource(s) may include a CPU, memory and/or storage supporting the desktop resource. In addition, the allocation of the computational resource(s) to the desktop resource may be augmented or reduced based at least in part on the utilization rate at or above an average utilization rate. In some embodiments, the management system is further configured to, upon determining that more than a predetermined number of the desktop pools have utilization rates exceeding the first predetermined threshold, scale up the desktop pools in the VDI. In addition, the management system may be further configured to select (i) one or more existing desktop pools to be cloned or (ii) one or more new desktop pools to be provisioned for additionally allocating the computational resource(s); and clone the selected existing desktop pool(s) and/or provision the selected new desktop pool(s).

In various embodiments, the management system is further configured to determine a revenue and/or an expense associated with each of the existing desktop pools and/or the new desktop pool(s); and select the existing desktop pool(s) to be cloned or the new desktop pool(s) to be provisioned based at least in part on the associated revenue(s) and/or expense(s). The revenue(s) of the selected existing desktop pool(s) to be cloned and/or the selected new desktop pool(s) to be provisioned may be larger than the expense(s) thereof by a predetermined factor. In addition, the method may further include resizing a viewpod in the VDI to provide one or more additional desktop pools. In one embodiment, the management system is further configured to resize a viewpod in the VDI to provide one or more additional desktop pools. In one embodiment, the management system is further configured to, upon determining that more than a predetermined number of the desktop pools have utilization rates below the second predetermined threshold, scale down the desktop pools in the VDI. In addition, the management system may be further configured to select the existing desktop pool(s) to be suspended or terminated; and suspend or terminate the selected desktop pool(s). In one implementation, the expense(s) of the selected existing desktop pool(s) to be suspended or terminated is larger than the revenue(s) thereof by a predetermined factor.

Another aspect of the invention relates to a method of managing one or more computational resources in a VDI having multiple desktop pools. In various embodiments, the method includes defining multiple time slots, each time slot having a start time and an end time; for each of multiple users utilizing a desktop resource supported by the computational resource(s) in the desktop pools, learning a user-specific utilization pattern associated with the computational resource(s) in one or more of the time slots; upon receiving a user's request for the desktop resource, selecting the first one of the desktop pools in the VDI based at least in part the learned user-specific utilization patterns and time associated with the user's request; and allocating the computational resource(s) from the selected first one of the desktop pools to the user.

In various embodiments, the method further includes identifying one of the time slots to which the time associated with the user's request belongs; the first one of the desktop pools is selected further based at least in part on the learned user-specific utilization patterns in the identified time slot. In addition, the utilization rate of the computational resource(s) supporting the selected first one of the desktop pools may be smaller than that of the computational resource(s) supporting any of the unselected desktop pools. In one embodiment, each of the desktop pools offers a price for providing the computational resource(s) to support the desktop resource; the price offered by the selected first one of the desktop pools is smaller than the prices offered by the unselected desktop pools. In addition, the method may further include, upon receiving the user's request, predicting a user utilization demand on the desktop resource supported by the computational resource(s) in the identified time slot; the first one of the desktop pools is selected further based at least in part on the predicted user utilization demand.

Each user-specific utilization pattern may be learned by collecting and analyzing multiple utilization records associated with the user utilizing the desktop resource supported by the computational resource(s) over a predetermined time. In addition, the learned user-specific utilization pattern in each of the time slots may be determined based on an average of the utilization records over the predetermined period of time in each of the time slots. In some embodiments, the method further includes classifying the learned utilization patterns in each of the time slots into multiple regions; and upon receiving the user's request, identifying the user's region; the first one of the desktop pools is then selected further based at least in part on the learned utilization patterns classified in the user's region. In addition, the method may further include, upon determining that a utilization rate of the computational resource(s) supporting the selected first one of the desktop pools exceeds a predetermined threshold, selecting the second one, different from the first one, of the desktop pools; and allocating the computational resource(s) from the selected second one of the desktop pools to the user. In one implementation, the utilization rate of the computational resource(s) supporting the second one of the desktop pool is below the predetermined threshold.

The method may further include, upon determining that a utilization rate of the computational resource(s) supporting the selected first one of the desktop pools exceeds a predetermined threshold, selecting one or more desktop pools to be cloned for additionally allocating the computational resource(s); and cloning the selected desktop pool(s). In addition, the method may further include determining a revenue and/or an expense associated with each of the desktop pools; and selecting the desktop pool(s) to be cloned based at least in part on the associated revenue(s) and/or expense(s). In some embodiments, the method further includes, upon determining that a utilization rate of the computational resource(s) supporting the selected first one of the desktop pools exceeds a predetermined threshold, selecting one or more new desktop pools to be provisioned for additionally allocating the computational resource(s); and provisioning the selected new desktop pool(s). In various embodiments, the method further includes determining a revenue and/or an expense associated with each of the new desktop pools; and selecting the new desktop pool(s) to be provisioned based at least in part on the associated revenue(s) and/or expense(s). In addition, the method may further include, upon determining that a utilization rate of the computational resource(s) supporting the selected first one of the desktop pools exceeds a predetermined threshold, resizing a viewpod in the VDI to provide one or more additional desktop pools. In one embodiment, the method further includes, upon determining that a utilization rate of the computational resource(s) supporting the selected first one of the desktop pools is below a predetermined threshold, suspending or terminating the first one of the desktop pools. The one or more computational resources may include a CPU, a memory and/or a storage supporting the desktop pools.

In yet another aspect, a computer system for managing one or more computational resources in a VDI having multiple desktop pools includes a management system configured to define multiple time slots, each time slot having a start time and an end time; for each of multiple users utilizing a desktop resource supported by the computational resource(s) in the desktop pools, learn a user-specific utilization pattern associated with the computational resource(s) in one or more of the time slots; upon receiving a user's request for the desktop resource, select the first one of the desktop pools in the VDI based at least in part the learned user-specific utilization patterns and time associated with the user's request; and allocate the computational resource(s) from the selected first one of the desktop pools to the user.

In various embodiments, the management system is further configured to identify one of the time slots to which the time associated with the user's request belongs; the first one of the desktop pools is selected further based at least in part on the learned user-specific utilization patterns in the identified time slot. In addition, the utilization rate of the computational resource(s) supporting the selected first one of the desktop pools may be smaller than that of the computational resource(s) supporting any of the unselected desktop pools. In one embodiment, each of the desktop pools offers a price for providing the computational resource(s) to support the desktop resource; the price offered by the selected first one of the desktop pools is smaller than the prices offered by the unselected desktop pools. In addition, the management system may be further configured to, upon receiving the user's request, predict a user utilization demand on the desktop resource supported by the computational resource(s) in the identified time slot; the first one of the desktop pools is selected further based at least in part on the predicted user utilization demand.

Each user-specific utilization pattern may be learned by collecting and analyzing multiple utilization records associated with the user utilizing the desktop resource supported by the computational resource(s) over a predetermined time. In addition, the learned user-specific utilization pattern in each of the time slots may be determined based on an average of the utilization records over the predetermined period of time in each of the time slots. In some embodiments, the management system is further configured to classify the learned utilization patterns in each of the time slots into multiple regions; and upon receiving the user's request, identify the user's region; the first one of the desktop pools is then selected further based at least in part on the learned utilization patterns classified in the user's region. In addition, the management system may be further configured to, upon determining that a utilization rate of the computational resource(s) supporting the selected first one of the desktop pools exceeds a predetermined threshold, select the second one, different from the first one, of the desktop pools; and allocate the computational resource(s) from the selected second one of the desktop pools to the user. In one implementation, the utilization rate of the computational resource(s) supporting the second one of the desktop pool is below the predetermined threshold.

The management system may be further configured to, upon determining that a utilization rate of the computational resource(s) supporting the selected first one of the desktop pools exceeds a predetermined threshold, select one or more desktop pools to be cloned for additionally allocating the computational resource(s); and clone the selected desktop pool(s). In addition, the management system may be further configured to determine a revenue and/or an expense associated with each of the desktop pools; and select the desktop pool(s) to be cloned based at least in part on the associated revenue(s) and/or expense(s). In some embodiments, the management system is further configured to, upon determining that a utilization rate of the computational resource(s) supporting the selected first one of the desktop pools exceeds a predetermined threshold, select one or more new desktop pools to be provisioned for additionally allocating the computational resource(s); and provision the selected new desktop pool(s). In various embodiments, the management system is further configured to determine a revenue and/or an expense associated with each of the new desktop pools; and select the new desktop pool(s) to be provisioned based at least in part on the associated revenue(s) and/or expense(s). In addition, the management system may be further configured to, upon determining that a utilization rate of the computational resource(s) supporting the selected first one of the desktop pools exceeds a predetermined threshold, resize a viewpod in the VDI to provide one or more additional desktop pools. In one embodiment, the management system is further configured to, upon determining that a utilization rate of the computational resource(s) supporting the selected first one of the desktop pools is below a predetermined threshold, suspend or terminate the first one of the desktop pools. The one or more computational resources may include a CPU, a memory and/or a storage supporting the desktop pools.

Still another aspect of the invention relates to a method of managing one or more computational resource(s) in a VDI. In various embodiments, the method includes (a) identifying multiple desktop pools associated with the VDI for allocating the computational resource(s); (b) for each of the desktop pools, determining a revenue and/or an expense for allocating the computational resource(s); and (c) determining whether to clone, suspend or terminate each desktop pool in the VDI based at least in part on the associated revenue and/or expense. In one implementation, the method further includes causing the desktop pools to be cloned, suspended or terminated in the VDI based on the determination in step (c).

In addition, the method may further include, upon determining that the revenue of the first one of the desktop pools is larger than the expense thereof by a predetermined factor, cloning the first one of the desktop pools. In one embodiment, the method further includes, upon determining that the expense of the second one of the desktop pools is larger than the revenue thereof by a predetermined factor, suspending or terminating the second one of the desktop pools. The revenue associated with each of the desktop pools may be determined based at least in part on a unit price associated with the computational resource(s) and a quantity of the computational resource(s) allocated to one or more users. The one or more computational resources may include a CPU, a memory and/or a storage supporting the desktop pools. In addition, the revenue and/or expense associated with each of the desktop pools may be determined based on an average of the revenue and/or expense over a predetermined period of time.

In another aspect, the invention relates to a computer system for managing one or more computational resources in a VDI. In various embodiments, the computer system includes a management system configured to (a) identify multiple desktop pools associated with the VDI for allocating the computational resource(s); (b) for each of the desktop pools, determine a revenue and/or an expense for allocating the computational resource(s); and (c) determine whether to clone, suspend or terminate each desktop pool in the VDI based at least in part on the associated revenue and/or expense. In one implementation, the management system is further configured to cause the desktop pools to be cloned, suspended or terminated in the VDI based on the determination in step (c).

In addition, the management system may be further configured to, upon determining that the revenue of the first one of the desktop pools is larger than the expense thereof by a predetermined factor, clone the first one of the desktop pools. In one embodiment, the management system is further configured to, upon determining that the expense of the second one of the desktop pools is larger than the revenue thereof by a predetermined factor, suspend or terminate the second one of the desktop pools. The revenue associated with each of the desktop pools may be determined based at least in part on a unit price associated with the computational resource(s) and a quantity of the computational resource(s) allocated to one or more users. The one or more computational resources may include a CPU, a memory and/or a storage supporting the desktop pools. In addition, the revenue and/or expense associated with each of the desktop pools may be determined based on an average of the revenue and/or expense over a predetermined period of time.

As used herein, the term "desktop" refers to a computing environment in which the user can launch, interact with, and manage applications, setting and data. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
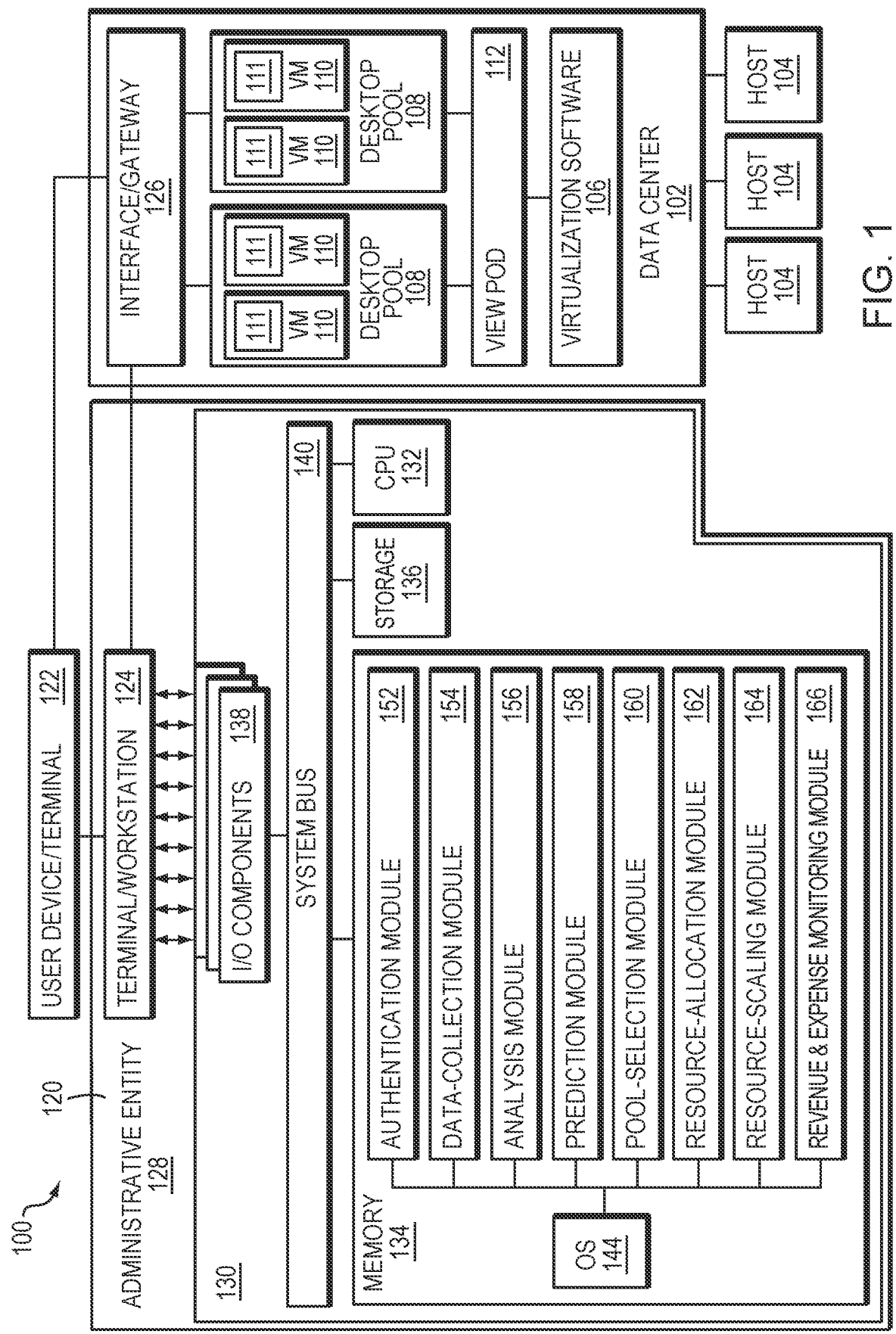
FIG. 1 schematically depicts an exemplary VDI environment in accordance with various embodiments of the current invention.

FIG. 1 schematically shows an exemplary VDI environment 100 including a datacenter 102 and multiple servers (or "hosts") 104 (collectively known as a cluster) connected thereto for providing an VDI platform. Each host 104 may provide the datacenter 102 with one or more computational resources such as a processor, memory, network, storage, etc. for supporting operations of the datacenter 102 in the VDI environment. For example, the datacenter 102 may include conventional virtualization software (or a hypervisor) 106 for virtualizing the local physical computational resources of the hosts 104, turning them into one or more pools of the computational resources that can be divided and assigned to desktop pools 108. In addition, the virtualization software 106 may create and manage VMs 110 in each desktop pool 108, performing computational virtualization, etc. Each VM 110 can provide a virtual desktop 111 to a remote user upon receiving the user's request. Desktop 111 is typically provided by a guest operating system and applications running within the VM 110, and generally includes a graphical display, but may include other inputs, such as audio, indicator lamps, tactile feedback, etc. In addition, desktop 111 may accept inputs from the user in the form of device inputs, such as keyboard and mouse inputs. Further, desktop 111 may transmit and receive device data, such as input/output from a FLASH memory device local to the user or to a local printer. In one embodiment, the datacenter 102 includes a plurality of servers and the VCENTER server-management system and the virtualization software 106 includes or consists of the VSPHERE software virtualization platform, both provided by VMWare, Inc.

In various embodiments, the virtualization software 106 aggregates all local capacity devices into one or more viewpods 112 shared by all hosts 104 in the VDI environment 100. The viewpod(s) 112 may be expanded (or scaled up) by adding capacity of devices or hosts with capacity to the VDI environment 100. In one embodiment, each viewpod 112 can support up to a predetermined number (e.g., 10,000) of virtual desktops; an additional viewpod 112 may be created to support additional virtual desktops when the desktops in the current viewpod exceed the predetermined number. Preferably, all (or at least some) hosts 104 in the VDI environment 100 share similar or identical resource configurations across all members. Such a consistent configuration may balance the computational resources in the desktop pools 108 across all devices and hosts in the VDI environment 100. In one embodiment, hosts without any local devices may also participate and run their VMs in the VDI environment 100.

In various embodiments, the remote user can request a desktop 111, interact with an application on the desktop and then rely on a management system 120 to allocate an appropriate amount of computational resources to provide the desktop and execute the application on the VMs 111 as further described below. In one embodiment, the management system 120 is configured to enable the user to view, on a desktop graphical user interface (via a user device 122), a desktop 111 that is running remotely in the datacenter 102. Subsequently, the user may interact with one or more applications on the desktop. In this manner, the user can interact with the desktop (and thereby the applications thereon) hosted in the VMs 110 as if the desktop were executing locally on his device 122. The management system 120 may communicate with the VDI environment 100 via, for example, a terminal and/or workstation 124 at the system side and an interface or gateway 126 designated as the front end at the datacenter side. In a typical service management, the management system 120 is a customer of the datacenter 102, whereas the users represented by terminals 122 are customers of the management system 120.

The management system 120 may also include an automated administrative entity 128 for managing and supporting the desktop 111 and/or execution of an application thereon. In one embodiment, the administrative entity 128 includes a networked computer 130 having a CPU 132, a memory 134 (which can be implemented as any type of volatile memory, such as SDRAM, or non-volatile, such as Flash memory), a storage device 136 (such as a magnetic, solid-state, or flash disk), and one or more input/output (I/O) components (e.g., a network I/O resource, I/O pathways, etc.) 138. The CPU 132 may be configurable to host one or more VMs and/or run various processes to manage and support execution of the computing application as further described below. In addition, the CPU 132 may provide the various computational functions described below through software, hardware, firmware, hardwiring, or any combination thereof. For example, the CPU 132 may include a general-purpose or special-purpose digital data processor programmed with software in a conventional manner. Memory 134 may temporarily store transitory information and allow the CPU 132 to quickly access the stored information. The storage device 136 may store more-permanent information in a non-volatile manner. For example, the storage device 136 may store a user database including records (e.g., log-in names, passwords, resource utilization histories, learned utilization patterns, etc.) associated with the users as further described below, and a database including the revenue and/or expense associated with each desktop pool 108. Additionally or alternatively, the user database and/or the revenues and expenses of the desktop pools 108 may be stored in the datacenter 102. The I/O components 138 may be connected to system interfaces. All of these elements in the computer 130 are interconnected using an internal bus 140. In addition, the computer 130 may include one or more external links 142 for connecting the computer 130 to elements in the VDI environment (e.g., the datacenter 102) and/or the user devices/terminals 122.

The memory 134 may include instructions for low-level operation of the computer 130, such as operating-system instructions, device-driver-interface instructions, or any other suitable instructions. The operating system is not limited to any particular type; rather, any operating system (such as WINDOWS, LINUX, or OSX) and/or other instructions are within the scope of the present invention. As further described below, the memory 134 may include an operating system 144 for directing the execution of low-level, basic system functions such as memory allocation, file management and operation of the main memory 134 and/or storage device 136. In addition, the memory 134 may include instructions, such as an authentication module 152 for authenticating the users; a data-collection module 154 for collecting the users' records of utilizing the computational resource(s); an analysis module 156 for analyzing the users' records, determining a utilization rate (or a utilization size) at or above a designated percentile (or an average utilization size), learning a resource utilization pattern associated with each user, and analyzing the pattern on a time-slot basis; a prediction module 158 for predicting a user's demand on the computational resources and/or a resource utilization rate in a desktop pool; a pool-selection module 160 for selecting the desktop pool; a resource-allocation module 162 for allocating the computational resources from a desktop pool to a VM assigned to the user; a resource-scaling module 164 for scaling up or down the computational resources in the desktop pool or the datacenter; and a revenue and expense monitoring module 166 for determining the revenue and/or expense for each desktop pool to allocate the computational resources to the VMs assigned to the users.

Figure 2A:
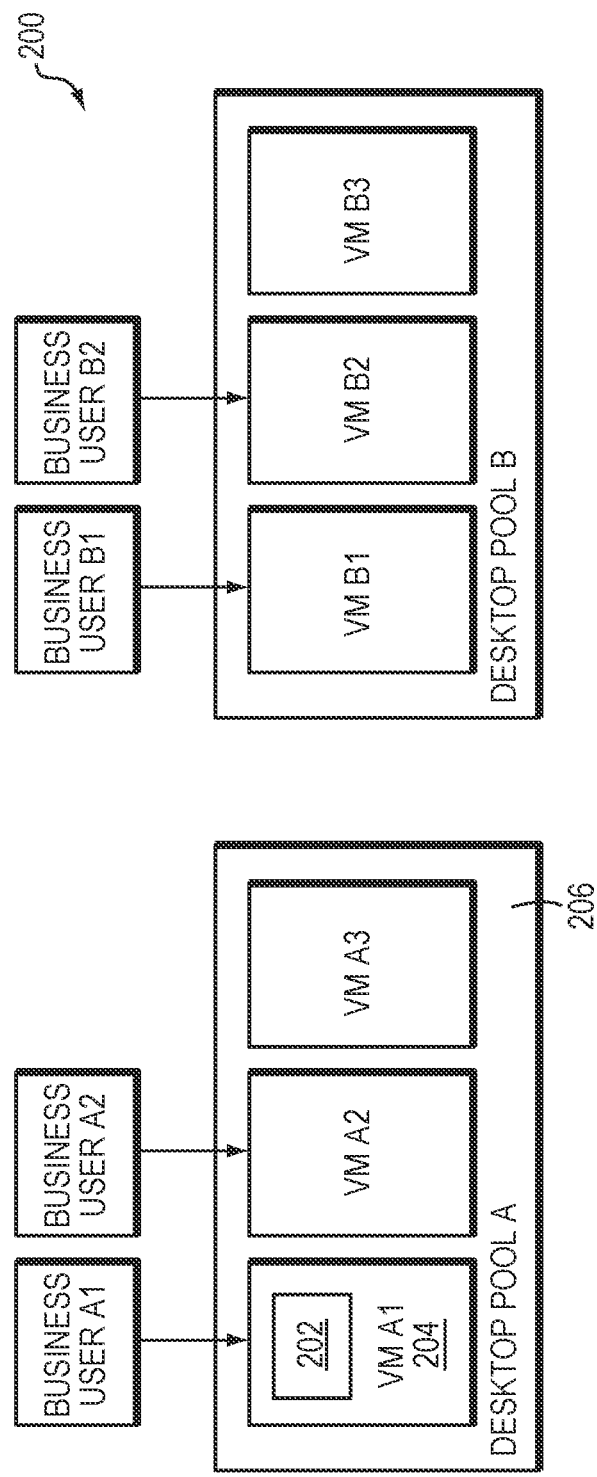
FIG. 2A depicts instantiation of a VM in a desktop pool to provide a desktop resource to a user in accordance with various embodiments of the current invention.

Referring to FIG. 2A, in operation, the user may request a virtual desktop resource 202 by logging into the VDI environment 200. Upon receiving the user's request, the management system 120 (e.g., the authentication module 152) may access the user database to retrieve the user's records (e.g., log-in name and password) and, based thereon, authenticate the user. Subsequently, the management system 120 (e.g., the pool-selection module 160) may select a desktop pool 206 and instantiate a VM 204 therein to provide the desktop resource 202 to the user as further described below. Each desktop pool typically includes multiple VMs and each VM is assigned to one user. Thus, one desktop pool may provide desktops to multiple users; different desktop pools may have different resource capacities. To allow the user to interact with the desktop 202 and an application thereon, the management system 120 (e.g., the resource-allocation module 162) may allocate computational resources (e.g., a CPU, memory, storage, network I/O resource, I/O pathways, etc.) from the desktop pool 206 to the VM 204 that is assigned to the user for providing the desktop 202. In one embodiment, multiple VMs are instantiated from a common desktop-pool image such that the VMs can utilize the same operating system environment and application software. Alternatively, each VM may be instantiated from a different desktop-pool image, and different VMs may utilize a different operating system environment or a different application software.

Figure 2B:
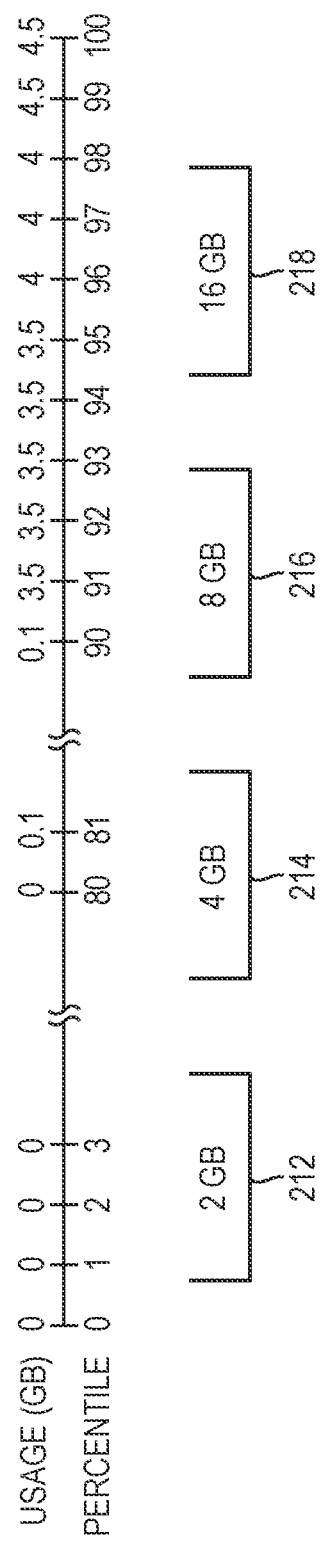
FIGS. 2B-2D depict exemplary collections of users' utilization records of a computational resource in accordance with various embodiments of the current invention.

In some cases, the user may demand more computational resources than those originally allocated to the VM 204. In one embodiment, the desktop pool 206 can allocate additional resources based on the user's demand. But because the sizes (or capacities) of the computational resources in each desktop pool are typically fixed, to allow efficient use of the computational resources and avoid congestion in each desktop pool, various embodiments assign the VMs and desktop pools to the users based on predicted user needs or demands on the resources. In one embodiment, the prediction is based on the user's utilization history of the computational resources. For example, the management system 120 (e.g., the data-collection module 154) may collect the users' records of utilizing the computational resources in the datacenter 102 for a predetermined time period (e.g., 3 days, 7 days or one month). The management system 120 can then randomly sample the collected records to determine the user's usage information (e.g., the utilization size or utilization rate) of each of the computational resources (e.g., the memory, CPU, storage, etc. for supporting the desktop-pool image). For example, referring to FIG. 2B, the management system 120 may randomly sample 100 records from the collection of records and organize the samples into percentiles based on the utilization size of the memory for the desktop-pool image. As depicted, 80 samples correspond to zero usage of the memory; ten samples correspond to 0.1 GB memory usage; five samples correspond to 3.5 GB memory usage; three samples correspond to 4 GB memory usage; and two samples correspond to 4.5 GB memory usage for supporting the desktop-pool image. The management system 120 then determines the usage at or above a designated percentile (e.g., $95^{th}$ percentile) and, based thereon, selects the desktop pool that can satisfy the user's needs. For example, the $95^{th}$ percentile in FIG. 2B corresponds to memory usage of 3.5 GB for the desktop-pool image;

assuming that the target utilization rate of the memory without causing congestion in the desktop pool is 70%, the management system (e.g., the prediction module 158) can compute that 3.5/0.7=5 GB memory may be required for a desktop pool to support the desktop-pool image to the user. In FIG. 2B, two desktop pools 216 and 218 can satisfy this need. In one embodiment, the management system 120 (e.g., the pool-selection module 160) selects the desktop pool that provides the available resource(s) closest to the user's needs (e.g., desktop pool 216 that provides 8 GB memory for the desktop-pool image). This can be achieved by quoting a price for purchasing the resources from a desktop pool using a "squared reciprocal price function." For example, the price P for purchasing a quantity Q of memory in a desktop pool that has capacity C can be quoted using an equation as follows:

$$P = \frac{1}{\left(\frac{Q}{C}\right)^2}$$

As a result, the smaller the resource capacity of the desktop pool, the lower will be the price the user must pay in order to receive the required resource therefrom.

Figure 2C:
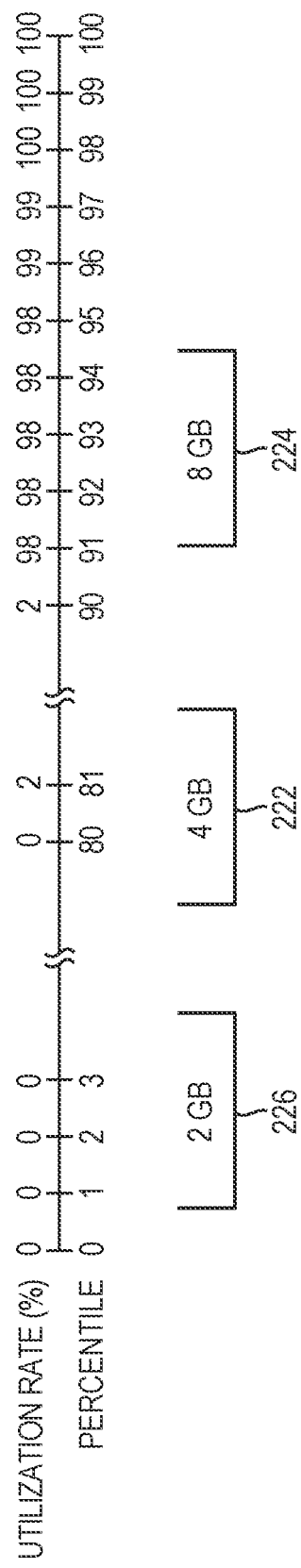

In some embodiments, the user who has been assigned a desktop pool is currently using the computational resources allocated therefrom. The management system may determine whether to augment or reduce the allocation of computational resources to the user by analyzing the user's records. For example, referring to FIG. 2C, the user may be currently using a desktop-pool image having a memory size of 4 GB in the desktop pool 222. The management system 120 (e.g., the data-collection module 154) may collect and/or sample the user's records of utilizing the desktop-pool image as described above, and each record corresponds to a utilization rate of the memory for the desktop-pool image. In one embodiment, the management system then organizes the utilization rates into percentiles and determines the utilization rate at or above a designated percentile (e.g., $95^{th}$ percentile). For example, in FIG. 2C, 80 samples correspond to a utilization rate of zero for the memory of the desktop-pool image; ten samples correspond to a 2% utilization rate; five samples correspond to a 98% utilization rate; two samples correspond to a 99% utilization rate; and three samples correspond to a 100% utilization rate. The management system 120 (e.g., the analysis module 156) may determine that the utilization rate at or above the designated percentile (e.g., $95^{th}$ percentile) is 98%. Assuming that the target utilization rate of the memory is 70%, the management system 120 (e.g., the prediction module 158) can then compute that the memory size required for the desktop-pool image is 4×0.98/0.7=5.6 GB. Based thereon, the management system (e.g., the analysis module 156) may determine whether to augment or reduce allocation of the memory to the user. For example, because the memory size in the currently assigned desktop pool 222 for the desktop-pool image is 4 GB, which is smaller than the required size, 5.6 GB, the management system 120 (e.g., the pool-selection module 160) may select a new desktop pool that can provide the required memory size for the desktop-pool image (e.g., desktop pool 224 that provides 8 GB memory for the desktop-pool image), and then cause the newly selected desktop pool to allocate the memory to the user (using, e.g., the resource-allocation module 162). In some embodiments, if more than one desktop is capable of providing the required resource(s) without causing congestion, the management system 120 may, again, select the desktop pool that provides the available resource(s) closest to the user's needs. Again, this can be achieved by quoting prices for the computational resources using the squared reciprocal price function described above.

Figure 2D:
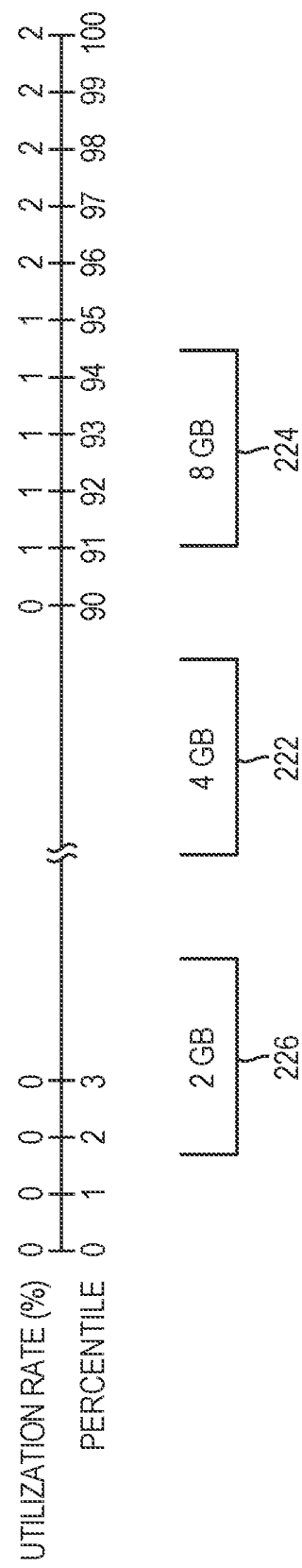

In various embodiments, the collected/sampled records indicate that the user's usage or utilization rate of the computational resource(s) is much lower than the target utilization rate (e.g., smaller by a factor of 5 or 10). In this situation, the management system 120 may reduce allocation of the computational resource(s) to the user by selecting a new desktop pool that provides the available resource(s) that is closest to the user's needs and then causing the newly selected desktop pool to allocate the resource(s) to the user. For example, referring to FIG. 2D, assume, again, that the user is currently using a desktop-pool image having a memory size of 4 GB in the desktop pool 222; in addition, the sampled records include 80 samples corresponding to a utilization rate of zero for the memory of the desktop-pool image; five samples correspond to a 1% utilization rate; and five samples correspond to a 2% utilization rate. The management system 120 (e.g., the analysis module 156) may determine that the utilization rate at or above the designated percentile (e.g., $95^{th}$ percentile) is 1%; based thereon, the prediction module 158 can compute the corresponding memory size for the 1% utilization rate as 4×0.01/0.7=0.057 GB. Because 0.057 GB is much smaller than the memory size, 4 GB, for the current desktop-pool image, the management system 120 (e.g., the pool-selection module 160) may select a new desktop pool that can provide the available resource(s) closer to the user's needs (e.g., desktop pool 226 that provides 2 GB memory for the desktop-pool image). Again, this can be achieved by pricing the resources using the squared reciprocal price function described above.

Accordingly, various embodiments analyze the user's records to predict the user's demand on the computational resource(s) and then, based thereon, assign a desktop pool that has an appropriate size of the computational resource(s) to the user and/or determine whether to augment or reduce the computational resource(s) allocated to the user. It should be noted that the percentile arrangement described above is an exemplary approach only; any suitable statistic measures based on the collected resource utilization records can be used to select a desktop pool for the user and/or determine whether to augment or reduce the computational resource(s) allocated to the user, and are thus within the scope of the present invention. For example, the management system 120 may determine an average utilization rate of the memory for the desktop-pool image in the sampled records. Subsequently, the management system 120 may compute the required memory size based on the average utilization rate (or a utilization rate above the average utilization rate) and the target utilization rate, and then, based thereon, select the desktop pool for allocating the computational resource(s) to the user as described above.

Additionally or alternatively, the management system 120 (e.g., the analysis module 156) may learn a utilization pattern of each user utilizing the desktop resource (and its supporting computational resources) through the day based on the user's records collected from a predetermined number of days (e.g., 3 days, 7 days or one month). In various embodiments, the management system 120 analyzes the utilization patterns on a "time-slot" basis. For example, the management system 120 (e.g., the analysis module 156) may divide the time of a day into a predetermined number of time slots (which may be set by the users or the management system 120) and analyze the learned utilization patterns in each time slot. Generally, each time slot corresponds to a temporal interval (i.e., a time duration) defined by a start time and an end time and the time slots collectively cover one full day. The time slots may have the same or different intervals, and may or may not overlap one another.

Figure 3A:
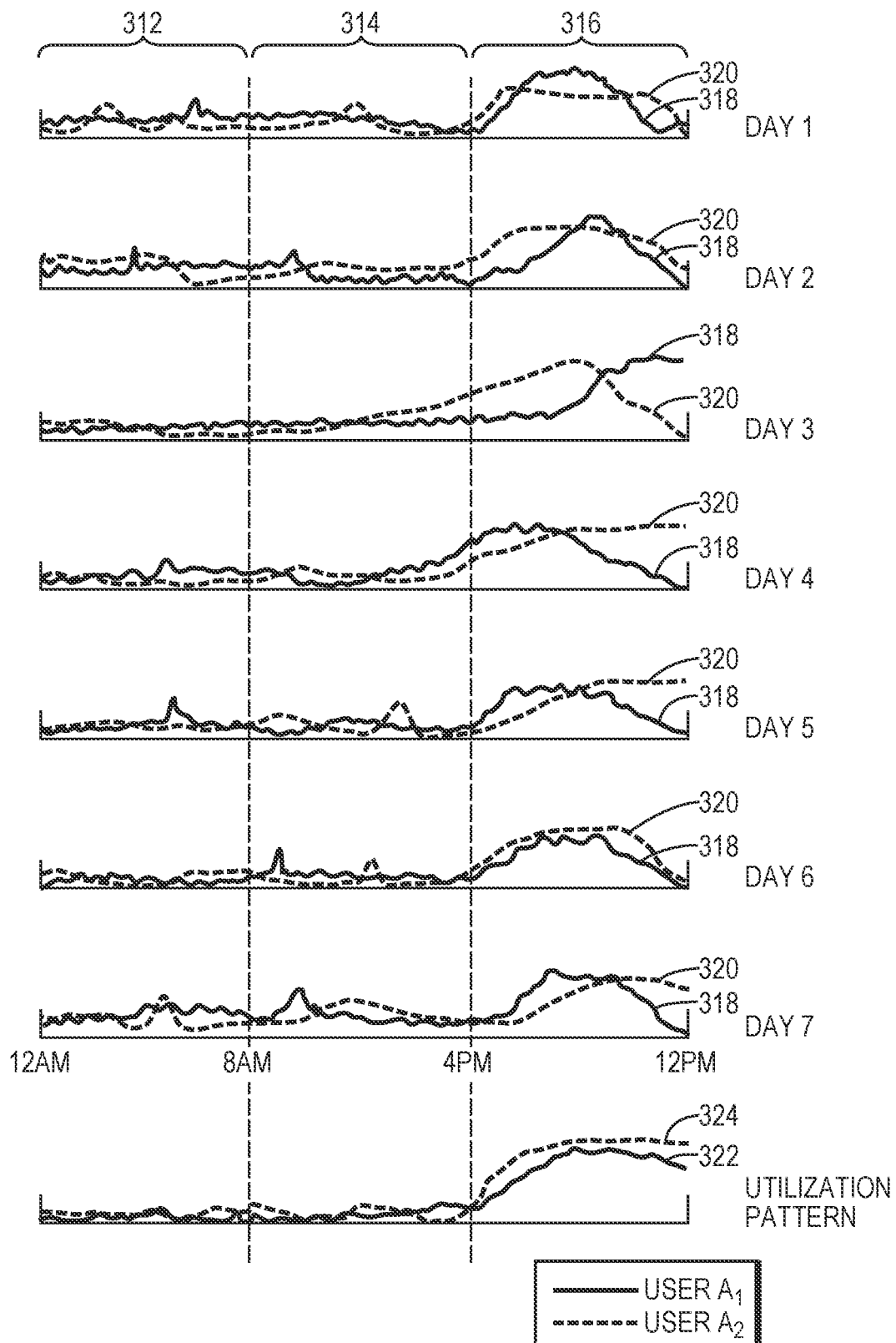
FIG. 3A depicts exemplary collections of users' utilization records of a computational resource and learned utilization patterns in accordance with various embodiments of the current invention.

For example, FIG. 3A depicts three time slots 312-316 having the same time duration (i.e., 8 hours) that collectively cover one full day. The collection of users' utilization records of the desktop resource and its supporting computational resources can then be analyzed in a time-slot manner to learn the user-specific utilization patterns in each time slot. For example, FIG. 3A includes collections of two users' records 318, 320 of utilizing memory in the same desktop pool in the past 7 days. Based thereon, the management system 120 (e.g., the analysis module 156) can determine the utilization patterns 322, 324 associated with these users and analyze the patterns on a time-slot basis. In one embodiment, each of the utilization patterns 322, 324 is determined based on an average of the utilization records associated with each user in the past 7 days. As shown, the utilization patterns 322, 324 indicate that both users have relatively high memory usage in time slot 316. Thus, if the same desktop pool is assigned to both users, congestion of the memory may occur in time slot 316 when both users request the desktop resource at a time in the time slot 316.

To avoid desktop-pool congestion resulting from assigning the same desktop pool to multiple users who may likely request the desktop resource in the same time slot, various embodiments assign the desktop pools to the users based on the learned user-specific utilization patterns. For example, upon receiving a user's request for the desktop resource, the management system 120 (e.g., the analysis module 156) may first access the user database to retrieve the user's utilization pattern. Based on the utilization pattern and the time of the user's request for the desktop resource, the management system 120 (e.g., the prediction module 158) can predict the user's demand for the computational resource(s) in the time slot to which the requesting time belongs. In addition, based on the predicted demand, the management system 120 may select a desktop pool (which may be the same or different from the desktop pool previously assigned to the user) that can satisfy the predicted demand, and subsequently allocate the computational resource(s) from the selected desktop pool to the VM assigned to the user for providing the desktop resource.

Figure 3B:
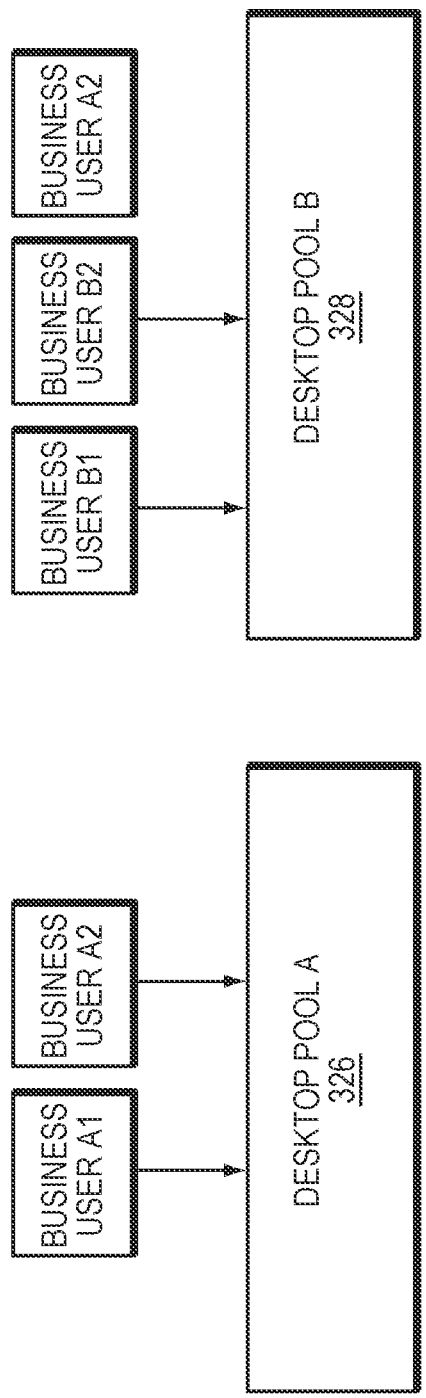
FIG. 3B depicts selection of a desktop pool having excess capacity to allocate the computational resources therein to a user for providing a virtual desktop resource in accordance with various embodiments of the current invention.

For example, referring to FIG. 3A and FIG. 3B, if user $A_2$ requests the desktop resource at 10 PM on day 8, the management system 120 (e.g., the analysis module 156) may first access user $A_2$'s records in the user database to retrieve his utilization pattern 324. Based thereon, the management system 120 may predict the amount of computational resource(s) that may be demanded by user $A_2$ at this time (e.g., in time slot 316 on day 8). In addition, the management system 120 may acquire the current usage information (e.g., the utilization rate) of the computational resource(s) in the desktop pool 326 that is currently assigned to user $A_1$. If allocation of the predicted amount of computational resource(s) to user $A_2$ will cause congestion of the desktop pool 326 in the time slot 316 (e.g., resulting in a utilization rate above a predetermined target value such as 70%), the management system 120 (e.g., the pool-selection module 160) may select a different desktop pool 328 that has excess capacity to provide the predicted demand on the computational resource(s) in the time slot 316 without causing congestion (e.g., resulting in a utilization rate below the predetermined target value); subsequently, the management system 120 (e.g., the resource-allocation module 162) may allocate the computational resource(s) from the newly selected desktop pool 328 to the VM assigned to user $A_2$ for providing the requested desktop resource.

Figure 3C:
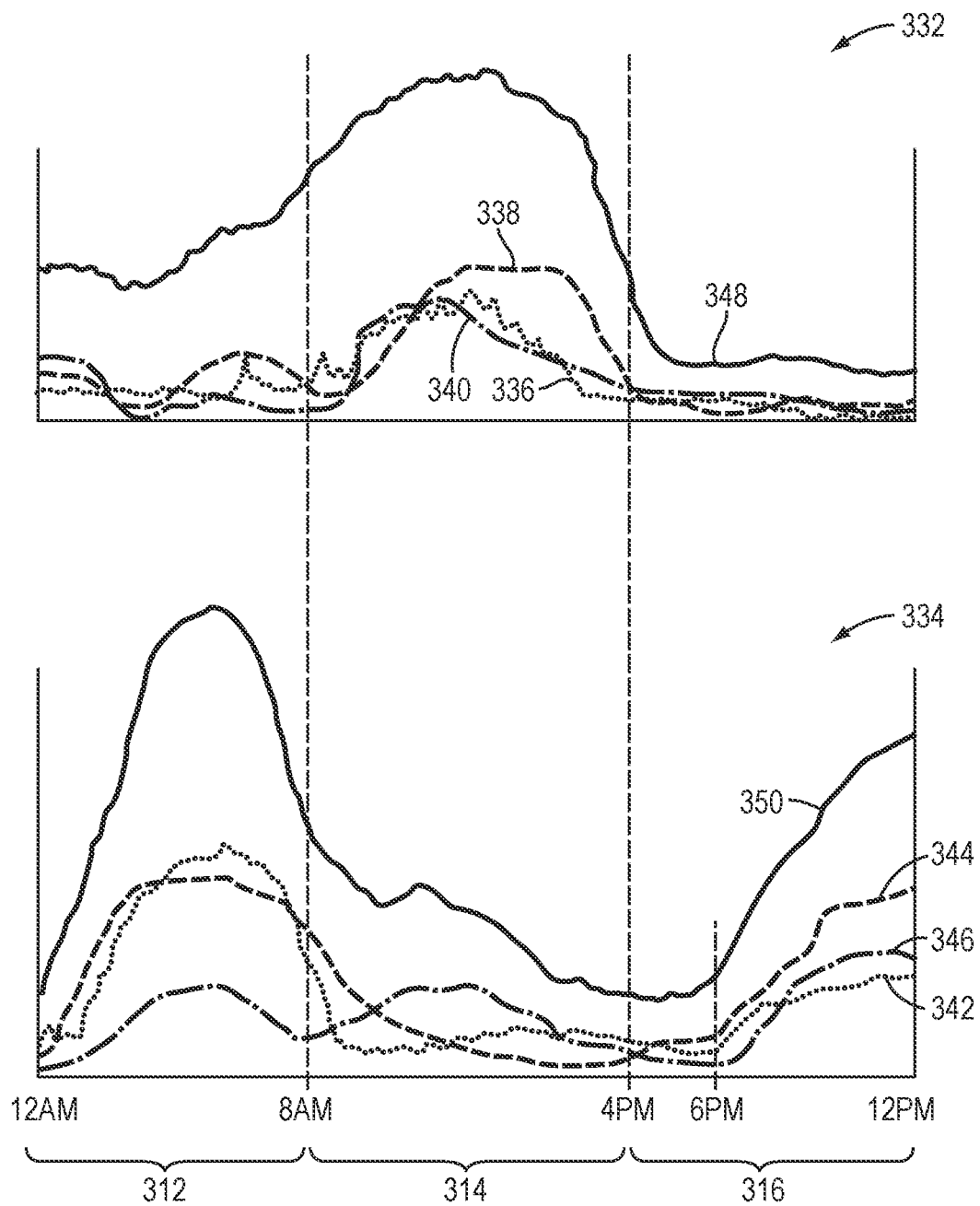
FIG. 3C depicts exemplary utilization rates of the computational resources in desktop pools in accordance with various embodiments of the current invention.

In various embodiments, the management system 120 (e.g., the prediction module 158) may predict the utilization rate of the computational resource(s) associated with each desktop pool in the time slot to which the time of the user's request belongs. In one embodiment, the prediction is based on the utilization patterns associated with all (or at least some) users assigned in each desktop pool. For example, referring to FIG. 3C, assuming each of the desktop pools 332, 334 is assigned to three users, the management system 120 (e.g., the prediction module 158) may predict the memory utilization rate in the time slot 316 based on the learned memory utilization patterns 336-346 of the users. In a simple example, the management system 120 predicts the total memory utilization rate 348, 350 by summing the utilization rates of all the users in the same desktop pool. As depicted, the total memory utilization rate 348 in desktop pool 332 is predicted to be relatively low within the entire time slot 316, whereas the total memory utilization rate in desktop pool 334 is predicted to increase significantly after 6 PM in the time slot 316. Thus, although at user A's requesting time for the desktop resource (e.g., 5 PM), both desktop pools 332 and 334 have relatively low memory utilization rates, only desktop pool 332 is a good candidates for allocating the memory to the VM assigned to user A for providing the desktop resource.

In some embodiments, more than one desktop pool has excess capacity (or a low resource utilization rate) to provide the predicted user's demand on the computational resource(s) in the time slot corresponding to the time of the user's request for desktop; the management system 120 (e.g., the pool-selection module 160) may select the desktop pool that provides the available resource(s) closest to the predicted demand. As described above, this can be achieved by quoting prices for purchasing the computational resource(s) in the desktop pools using the squared reciprocal price function. The smaller the resource capacity the desktop pool has, the lower will be the price the user must pay in order to receive the computational resource(s) therefrom; consequently, the management system 120 (e.g., the pool-selection module 160), upon receiving the quotes, may automatically select the desktop pool that has the available resource(s) closest to the predicted user's demand.

Accordingly, various embodiments allocate the computational resource(s) based on the predicted user's demand on the computational resource(s) and the predicted resource utilization rates associated with the desktop pools in a time-slot manner. This approach may advantageously provide flexibility to select the desktop pool to optimally fit the user's demand on the computational resource(s) and thereby alleviate pressure on the desktop pools that are congested in particular time slots of the day. Generally, as the number of time slots per day increases, so will the flexibility and the accuracy of selections made by the management systems among the desktop pools to allocate the computational resource(s) to the user-assigned VMs without causing congestion. In addition, because the user-specific utilization patterns are learned from the long-term (e.g., 7 days or a month) utilization activities of the users, prediction of the users' demand on the computational resource(s) based thereon may have high accuracy.

Figure 3D:
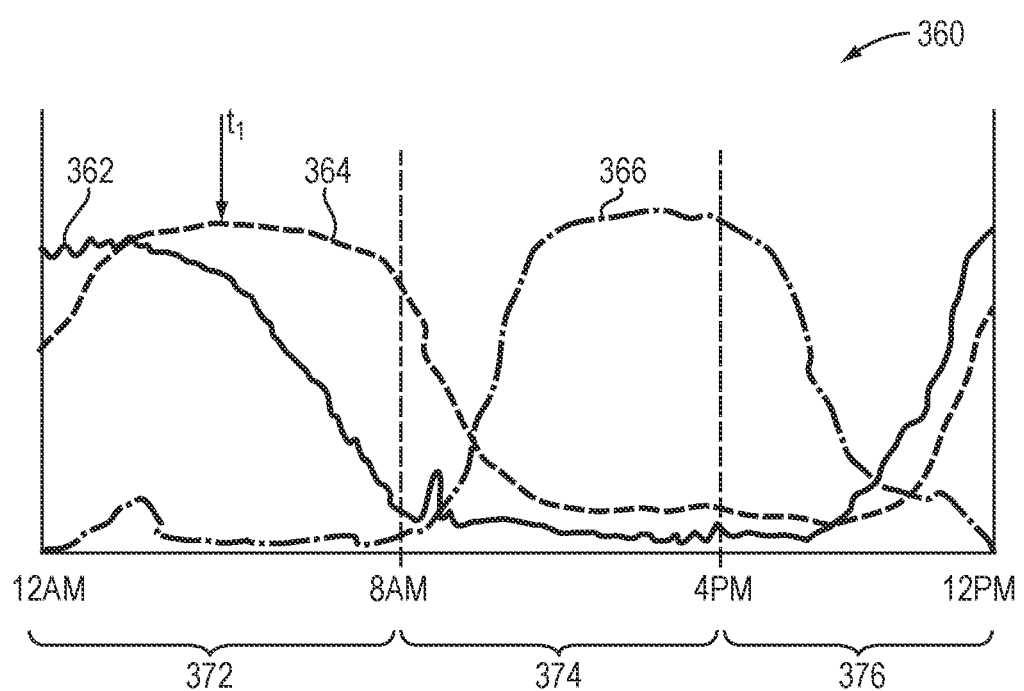
FIG. 3D depicts exemplary utilization patterns of users in different geographic regions in accordance with various embodiments of the current invention.

In some embodiments, the learned utilization patterns in each time slot are classified based on their geographic regions (e.g., north America, Europe, Asia, etc.). Upon receiving the user's request for a desktop resource, the management system 120 (e.g., the analysis module 156) may first identify the user's geographic region, and then select the desktop pool for allocating the computational resource(s) to the user based on the learned utilization patterns classified in the same region as the requesting user. For example, FIG. 3D depicts a desktop pool 360 assigned to three users 362-366: users 362, 364 are in Asia and user 366 is in North America. The Asian users 362, 364 have relatively high demands on memory in the time slot 372 and low demands on memory in the time slot 374 compared to the North American user 366. When the Asian user 362 requests the desktop resource at time $t_1$, the management system 120 (e.g., the prediction module 158) may predict the utilization rate of the memory in time slot 372 based on the utilization patterns of the Asian users 362, 364 without considering that of the North American user 366. This approach may advantageously save computational time and resources.

Figure 4:
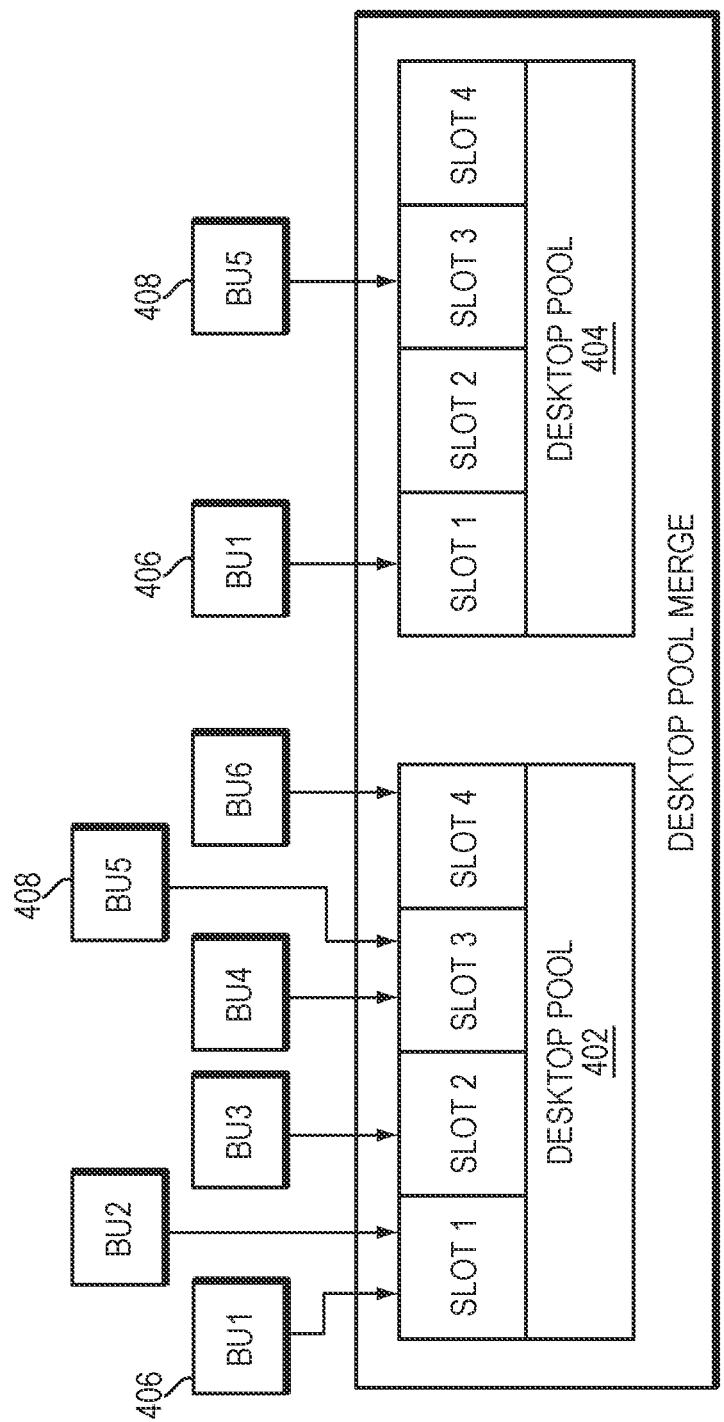
FIG. 4 depicts migration of one or more VMs from a congested desktop pool to a desktop pool having excess capacity in accordance with various embodiments of the current invention.

Occasionally, congestion in the desktop pool may still occur even when the approaches described above are implemented to assign the desktop pool to the users (e.g., based on the learned user-specific utilization patterns and the current or predicted utilization rate of the resource(s) in the desktop pool). This may happen when, for example, some users need substantially more computational resource(s) than was predicted. As a result, it may be desired to migrate one or more VMs assigned to the user(s) to a different desktop pool that has excess resource capacities without causing congestion, and thereby alleviate pressure on the congested desktop pool. For example, referring to FIG. 4, the desktop pool 402 is congested in time slot 1 and time slot 3. To relieve the congestion, the management system (e.g., the pool-selection module 160) may select one or more desktop pools 404 that have excess resource capacities in time slots 1 and 3. Again, the selection may be based on, for example, the users' demand on the resource(s) in time slots 1 and 3, and the current or predicted utilization rates of the computational resource(s) associated with the desktop pools in time slots 1 and 3 as described above. Thereafter, the management system 120 (e.g., the resource-allocation module 162) may merge the newly selected desktop pool 404 with the congested desktop pool 402, and then migrate (i) one or more VMs assigned to the corresponding user(s) (e.g., user 406) from the congested desktop pool 402 to the selected desktop pool 404 in time slot 1 and (ii) one or more VMs assigned to the corresponding user(s) (e.g., user 408) from the congested desktop pool 402 to the selected desktop pool 404 in time slot 3.

Alternatively, the management system 120 (e.g., the resource-scaling module 164) may scale up the computational resource(s) in the congested desktop pool 402 by cloning one or more VMs therein and/or provisioning additional VMs. Additionally or alternatively, more hosts 104 may be added to support the congested desktop pool 402, thereby increasing the capacity of the computational resources. In some embodiments, the management system 120 (e.g., the resource-scaling module 164) selects one or more existing desktop pools in the datacenter 102 and then clones the selected desktop pool(s) to provide additional computational resources to the VMs in the congested desktop pools. Additionally or alternatively, the management system 120 (e.g., the resource-scaling module 164) may select one or more new desktop pools and then provision the new desktop pool(s) to provide additional computational resources to the VMs in the congested desktop pools. Selection of the existing desktop pool(s) to be cloned and/or the new desktop pool(s) to be provisioned may be based on the revenue and/or expense associated with each desktop pool for providing the computational resources to the users as further described below. For example, if the revenue associated with the desktop pool is larger than the expense associated therewith by a predetermined factor (e.g., two times, five times or ten times), the desktop pool is a good candidate for being cloned or provisioned.

In various embodiments, the management system 120 (e.g., the resource-scaling module 164) may resize the viewpod 112 in the VDI environment 100 to provide one or more additional desktop pools for relieving the desktop pool congestion. Typically, each viewpod corresponds to users in a specific region and can support the desktops of up to 10,000 users. If the viewpod reaches its capacity, in one embodiment, the management system can add a new viewpod by including a new set of hosts 104 and a new datacenter 102.

Additionally, the management system (e.g., the resource-scaling module 164) may scale up the computational resources in the VDI environment to supporting additional desktops when more than a predetermined number (e.g., 10) of the desktop pools has a utilization rate exceeding a target utilization rate (e.g., 70%). For example, the management system may select one or more existing desktop pools to be cloned and/or one or more new desktop pools to be provisioned, and clone/provision the selected desktop pool(s). Again, selection of the desktop pool(s) to be cloned/provisioned may be based on the revenues and/or expenses associated with the desktop pools (e.g., when the revenues associated with the desktop pools are larger than the expenses by a predetermined factor such as two times, five times or ten times).

In some embodiments, the computational resources in the desktop pool are under-utilized (e.g., the actual utilization rate is much smaller (e.g., by a factor of 5 or 10) than the target utilization rate (e.g., 70%)) for a predetermined time (e.g., 10 days or one month); in this situation, the management system 120 (e.g., the resource-scaling module 164) may suspend or terminate the desktop pool. Additionally or alternatively, the management system may scale down the computational resources in the VDI environment when more than a predetermined number (e.g., 10) of the desktop pools has a utilization rate much smaller (e.g., by a factor of 5 or 10) than the target utilization rate. For example, the management system may select one or more desktop pools based on, again, the revenues and/or expenses associated therewith (e.g., when the expenses associated with the desktop pools are larger than the revenues by a predetermined multiple such as 2, 5 or 10), and then suspend or terminate the selected desktop pool(s).

In various embodiments, the management system 120 (e.g., the revenue and expense monitoring module 166) maintains a full accounting of the revenues and costs of allocating the computational resources from each desktop pool to the VMs for providing desktop resources to the users, monitors these accounts and provides notifications upon the occurrence of certain accounting events. The revenue and expense monitoring module 166, by itself or with the assistance of an incorporated or separate return-on-investment (ROI) module (not shown), enables the desktop pools to monitor the ROI of the computational resources. The ROI is defined as revenue divided by cost, where revenue is the income from real and/or virtual payments collected by the desktop pools from the user and/or datacenter 102. Cost may be assigned in any suitable fashion; for example, the cost may be the out-of-pocket expense of using an external resource, or the fully loaded, attributed internal cost of using an on-premises resource. The cost may be measured in real currency (for out-of-pocket expenses) or virtual currency (for attributed internal costs). The revenue and expense monitoring module 166 may compute the revenue from the computational resources based on a unit price thereof and the amount of computational resources contributed by each desktop pool to the VMs for providing the desktop resources to the users. Similarly, the cost may include the amounts actually paid by the desktop pool for providing the computational resources required for providing the desktop resources as well as the attributed cost including overhead of support by on on-premises equipment. The revenue and/or expense may be computed over a predetermined period of time (e.g., ten hours, ten days, one month, etc.). Further details concerning approaches to determining and monitoring resource revenue and/or expense are provided, for example, in U.S. Pat. No. 10,346,775, the entire disclosure of which is hereby incorporated herein by reference.

In various embodiments, based on the monitored revenue and/or expense, the management system 120 (e.g., the resource-scaling module 164) may determine whether and/or which desktop pool to clone/provision in order to scale up the computational resources and/or to suspend/terminate in order to scale down the computational resources in the VDI environment. For example, when the analysis module 156 determines that an additional desktop pool is required to support the user's interaction with a desktop, the revenue and expense monitoring module 166 may identify one or more desktops whose revenues (real and/or attributable) are larger than the expenses (also real and/or attributable) by a predetermined factor (e.g., 2, 5 or 10). Based thereon, the resource-scaling module 164 may then clone the identified desktop pool(s) to provide the required additional computational resources. Conversely, when the revenue and expense monitoring module 166 determines that the expense for a desktop pool is larger than the revenue by the predetermined factor, the resource-scaling module 164 may suspend/terminate this desktop pool and reduce the capacity of the computational resources in the VDI environment.

In various embodiments, the decision whether to clone/provision or suspend/terminate a desktop pool depends on the revenue and expense associated with the desktop pool only and may be independent of the actual utilization rate(s) of the underlying computational resources (e.g., the storage, CPU, memory, etc.). For example, if the revenue and expense monitoring module 166 determines that the revenue for a desktop pool is larger than the expense by the predetermined factor, the resource-scaling module 164 may clone the desktop pool to provide additional computational resources even though these resources are not yet over-utilized. In one embodiment, if the revenue and expense monitoring module 166 determines that it is inexpensive (e.g., having an ROI of 5) to operate a desktop pool, the resource-scaling module 164 may add one or more desktop pools to support the desktops (since the expenses are small). This may afford the opportunity to overprovision as well as avoid the occurrence of over-utilization of the computational resources. Similarly, when the revenue and expense monitoring module 166 determines that the desktop pool is too expensive to operate (e.g., having an ROI of 0.5), the resource-scaling module 164 may not add additional desktop pools even if the current desktop pool is congested.

In one embodiment, the resource-scaling module 164 can proactively clone/provision one or more desktop pools to provide additional computational resources even though the revenues and expenses associated therewith are acceptable and there is no reason to expand with the existing workload. In this way, the desktop pools may receive some profits when a new user logs into the VDI environment to request a desktop resource later.

Figure 5A:
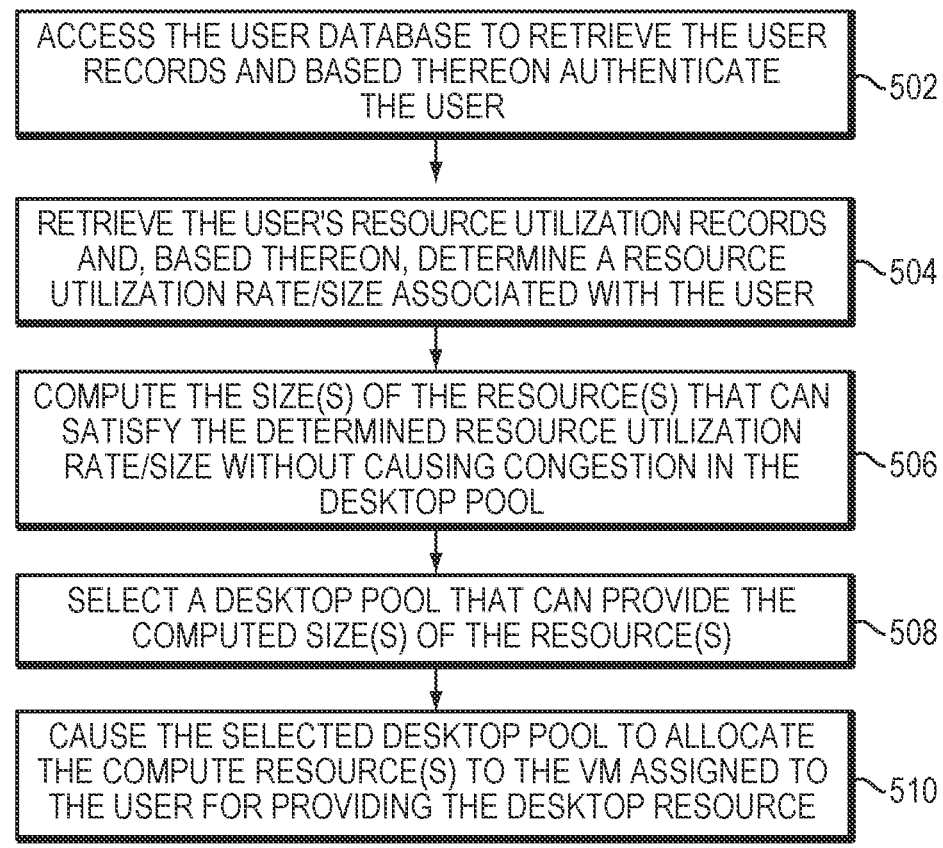
FIGS. 5A and 5B are flow charts illustrating exemplary approaches for allocating computational resources from a desktop pool to a VM assigned to a user for providing a virtual desktop resource in accordance with various embodiments of the present invention.

FIG. 5A is a flow chart illustrating an exemplary approach 500 for allocating the computational resources from a desktop pool to a VM assigned to a user for providing a virtual desktop resource in accordance herewith. In a first step 502, the management system 120, upon receiving a user's request for the virtual desktop resource, accesses the user database to retrieve the user's records (such as the log-in name and password) and, based thereon, authenticates the user. In a second step 504, the management system retrieves, from the user database, the user's resource utilization records and, based thereon, determines a resource utilization rate/size associated with the user. For example, the management system may sample the utilization records, organize the samples into percentiles and then determine the utilization rate/size at or above a designated percentile (or, in some embodiments, at or above an average utilization rate). Based thereon, the management system 120 computes the size(s) of the computational resource(s) required to satisfy the resource utilization rate/size determined in step 504 without causing congestion in the desktop pool (in a step 506). Subsequently, the management system selects a desktop pool that can provide the required size(s) of the computational resource(s) (in a step 508). In one embodiment, the selected desktop pool provides the available resource(s) closest to the required size(s) of the computational resource(s). Thereafter, the management system causes the selected desktop pool to allocate the computational resource(s) to the VM assigned to the user for providing the desktop resource (in a step 510).

Figure 5B:
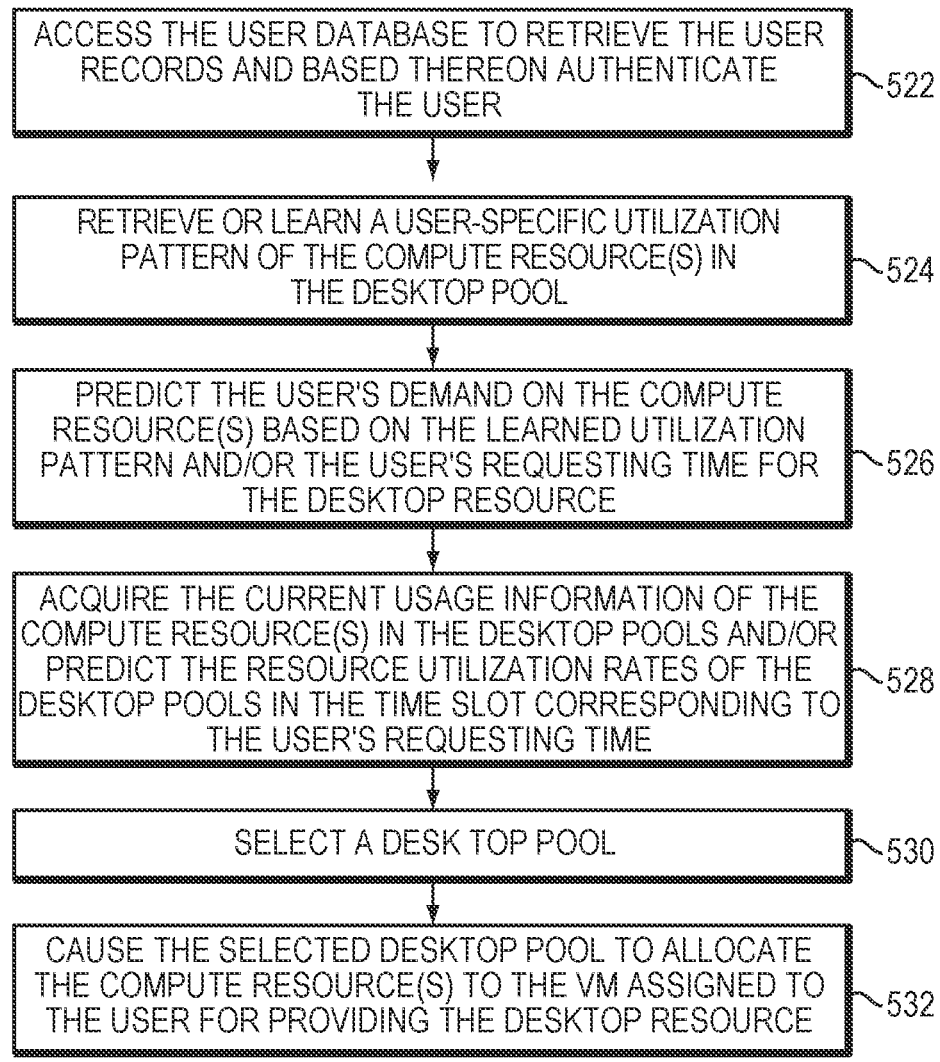

FIG. 5B is a flow chart illustrating another exemplary approach 520 for allocating the computational resources from a desktop pool to a VM assigned to a user for providing a virtual desktop resource in accordance herewith. In a first step 522, the management system 120, upon receiving a user's request for the virtual desktop resource, accesses the user database to retrieve the user's records (such as the log-in name and password) and, based thereon, authenticates the user. In a second step 524, the management system retrieves, from the user database, a learned user-specific utilization pattern of the computational resource(s) in the desktop pool. If the user-specific utilization pattern is not found in the user database, the management system (e.g., the analysis module 156) retrieves, from the user database, the user's records of utilizing the desktop resource for a predetermined number of days (e.g., 3 days, 7 days or one month), and then learns the utilization pattern based thereon. In a third step 526, the management system 120 predicts the user's demand on the computational resource(s) based on the learned utilization pattern. In one embodiment, the predicted resource demand is based on the time of the user's request for the desktop resource and the utilization pattern in the time slot to which the time of the user's request belongs. In a fourth step 528, the management system acquires the current usage information (e.g., the utilization rate) of the computational resource(s) in the desktop pools and/or predicts the resource utilization rates of the desktop pools in the time slot corresponding to the time of the user's request. In one embodiment, the utilization rate of each desktop pool is predicted based on the utilization patterns of all (or at least some) users in the desktop pool. In a fifth step 530, based on the predicted user's demand on the computational resource(s) and the current and/or predicted utilization rates of the desktop pools in the time slot corresponding to the time of the user's request, the management system selects a desktop pool for allocating the computational resources to the VM assigned to the user so as to provide the requested desktop resource. In a sixth step 532, the management system causes the selected desktop pool to allocate the computational resource(s) to the VM assigned to the user.

Figure 5C:
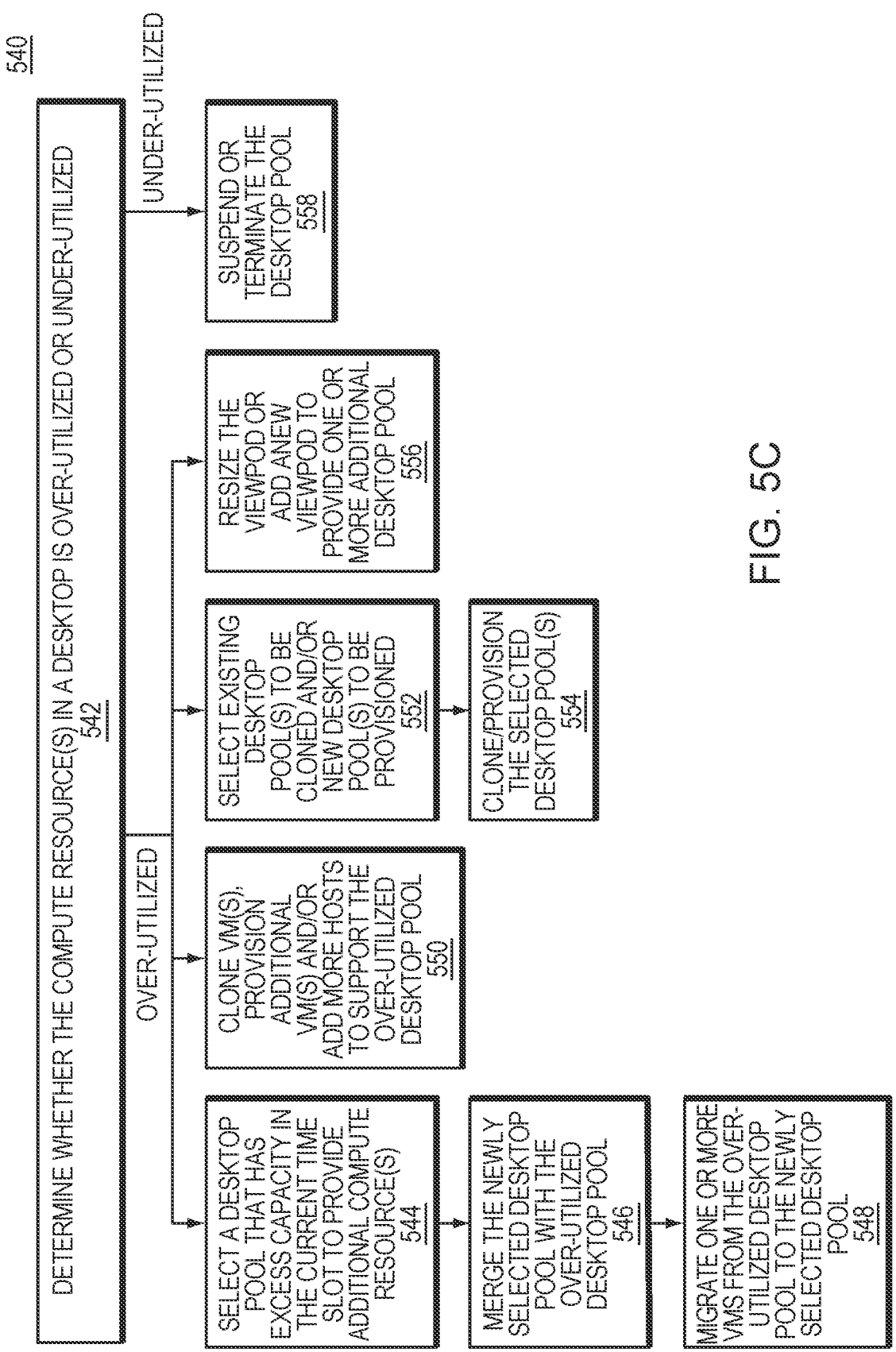
FIG. 5C is a flow chart illustrating an exemplary approach for managing computational resources in a VDI environment in accordance with various embodiments of the current invention.

FIG. 5C is a flow chart illustrating an exemplary approach 540 for managing computational resources in a VDI environment in accordance herewith. In a first step 542, the management system (e.g., the analysis module 156) determines whether the computational resource(s) in a desktop is over-utilized (and thereby cause congestion) or under-utilized based on the current resource utilization rate and a target utilization rate of the desktop pool. Upon determining that the desktop pool is over-utilized, the management system selects one or more desktop pools that have excess capacity in the current time slot to provide additional computational resource(s) (step 544). Again, selection of the desktop pool(s) may be based on, for example, the current and/or predicted utilization rates of the computational resource(s) associated with the desktop pools in the current time slot. The management system 120 then merges the newly selected desktop pool(s) with the currently over-utilized desktop pool (step 546), and migrate one or more VMs from the over-utilized desktop pool to the newly selected desktop pool(s) (step 548). Alternatively, the management system 120 scales up the resource(s) in the currently over-utilized desktop pool by cloning one or more VMs therein, provisioning additional VMs and/or adding more hosts to support the over-utilized desktop pool (step 550). Additionally or alternatively, the management system 120 may select one or more existing desktop pools to be cloned and/or one or more new desktop pools to be provisioned for providing additional computational resources (step 552). Selection of the existing desktop pool to be cloned and/or the new desktop pool to be provisioned may be based on, for example, the revenue and/or expense associated with each desktop pool for allocating the computational resource(s) to the VMs for providing the virtual desktop resource. Subsequently, the management system clones/provisions the selected desktop pool(s) (step 554). In some embodiments, the management system 120 resizes the viewpod and/or adds a new viewpod to provide one or more additional desktop pools in order to relieve pressure on the currently over-utilized desktop pool (step 556). If, however, the desktop is under-utilized, the management system 120 suspends or terminates the desktop pool (e.g., step 558). In one embodiment, steps 538-544 for scaling up/down the computational resource(s) are performed on a time-slot basis.

Figure 5D:
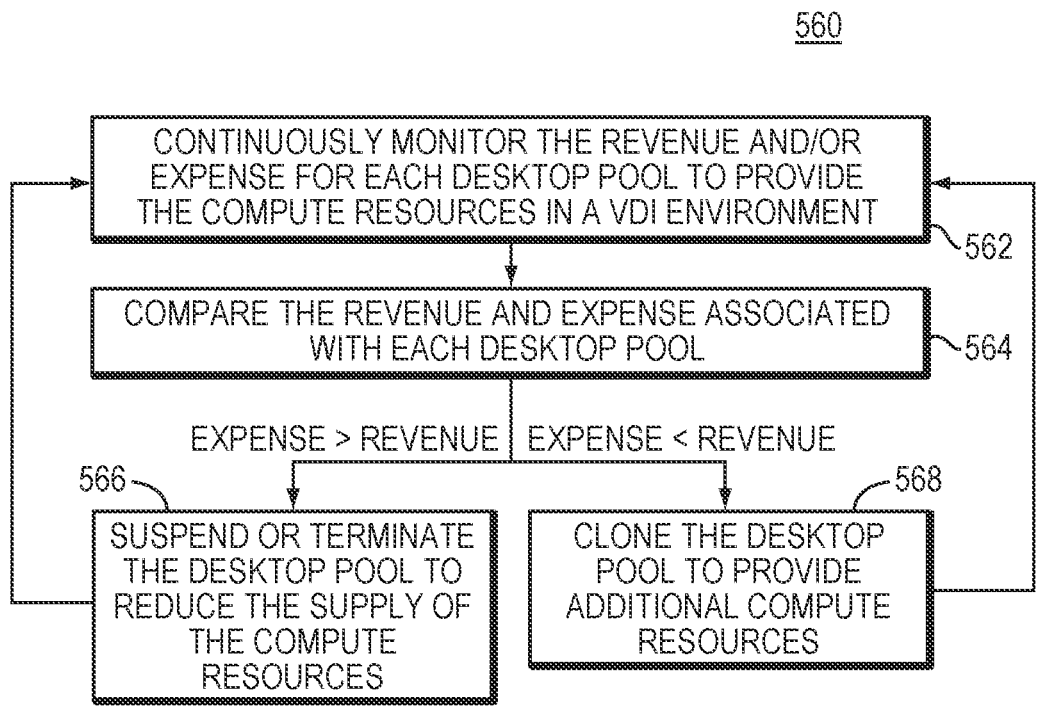
FIG. 5D is a flow chart illustrating an exemplary approach for scaling up or down the computational resources in a VDI environment in accordance with various embodiments of the present invention.

FIG. 5D is a flow chart illustrating an exemplary approach 560 for scaling up or down the computational resource(s) in a VDI environment. In a first step 562, the management system 120 (e.g., the revenue and expense monitoring module 166) continuously monitors the revenue and/or expense for each desktop pool providing the computational resource(s) in the VDI environment. In a second step 564, the management system 120 (e.g., the revenue and expense monitoring module 166) compares the revenue and expense associated with each desktop pool. If the expense for a desktop pool is larger than the revenue by a predetermined factor (e.g., two times, five times or ten times), the management system 120 (e.g., the resource-scaling module 164) suspends or terminates the desktop pool (in a step 566). Conversely, if the revenue for a desktop pool is larger than the expense by the predetermined factor, the management system 120 clones the desktop pool (in a step 568).

In general, the modules including the authentication module 152, data-collection module 154, analysis module 156, prediction module 158, pool-selection module 160, resource-allocation module 162, resource-scaling module 164 and revenue and expense monitoring module 166 described above may be implemented in hardware, software, or a combination of both, whether integrated within the CPU 132, or provided by a separate external processor or other computational entity or entities.

In addition, the manager system 120 may include one or more additional modules implemented in hardware, software, or a combination of both to perform functionality described above. For embodiments in which the functions are provided as one or more software programs, the programs may be written in any of a number of high level languages such as PYTHON, FORTRAN, PASCAL, JAVA, C, C++, C#, BASIC, TENSORFLOW, THEANO, KERAS, PYTORCH, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms "computational resources," "computer resources," "computational resources," "computing resources," and "computational commodities" are used herein interchangeably. Further, it is to be understood that the features of the various embodiments described herein are not necessarily mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of managing at least one computational resource in a virtual desktop infrastructure (VDI) comprising a plurality of desktop pools, the method comprising:
defining a plurality of time slots, each time slot having a start time and an end time;
for a user utilizing a desktop resource supported by the at least one computational resource in the plurality of desktop pools, learning, by an analysis module, a user-specific utilization pattern associated with the at least one computational resource in at least one of the time slots based upon a collection of data records in a computer database associated with a usage of the at least one computational resource collected over a predetermined period of time;

upon receiving a user's request for the desktop resource, selecting, by a pool selection module a first one of the desktop pools in the VDI based at least in part on the learned user-specific utilization patterns and time associated with the user's request wherein a utilization rate of the at least one computational resource supporting the selected first one of the desktop pools is smaller than that of the at least one computational resource supporting any of the unselected desktop pools;

allocating, by a resource allocation module, the at least one computational resource from the selected first one of the desktop pools to the user; and executing, for the desktop resource, the at least one computational resource from the selected first one of the desktop pools in response to the allocating.

2. The method of claim 1, further comprising identifying one of the time slots to which the time associated with the user's request belongs, wherein the first one of the desktop pools is selected further based at least in part on the learned user-specific utilization patterns in the identified time slot.

3. The method of claim 2, further comprising, upon receiving the user's request, predicting a user utilization demand on the desktop resource supported by the at least one computational resource in the identified time slot, wherein the first one of the desktop pools is selected further based at least in part on the predicted user utilization demand.

4. The method of claim 1, wherein each of the plurality of desktop pools offers a price for providing the at least one computational resource to support the desktop resource, the price offered by the selected first one of the desktop pools being smaller than the prices offered by the unselected desktop pools.

5. The method of claim 1, wherein each user-specific utilization pattern is learned by collecting and analyzing a plurality of utilization records associated with the user utilizing the desktop resource supported by the at least one computational resource over a predetermined time.

6. The method of claim 5, wherein the learned user-specific utilization pattern in each of the time slots is determined based on an average of the utilization records over the predetermined period of time in each of the time slots.

7. The method of claim 1, further comprising:
classifying the learned user-specific utilization patterns in each of the time slots into a plurality of regions; and
upon receiving the user's request, identifying a user's region,
wherein the first one of the desktop pools is selected further based at least in part on the learned user-specific utilization patterns classified in the user's region.

8. The method of claim 1, further comprising:
upon determining that a utilization rate of the at least one computational resource supporting the selected first one of the desktop pools exceeds a predetermined threshold, selecting a second one, different from the first one, of the desktop pools; and
allocating the at least one computational resource from the selected second one of the desktop pools to the user.

9. The method of claim 8, wherein the utilization rate of the at least one computational resource supporting the selected second one of the desktop pools is below the predetermined threshold.

10. The method of claim 1, further comprising:
upon determining that a utilization rate of the at least one computational resource supporting the selected first one of the desktop pools exceeds a predetermined threshold, selecting at least one of the plurality of desktop pools to be cloned for additionally allocating the at least one computational resource; and
cloning the selected at least one of the desktop pools.

11. The method of claim 10, further comprising:
determining at least one of a revenue or an expense associated with each of the plurality of the desktop pools; and
selecting the at least one of the plurality of desktop pools to be cloned based at least in part on the associated revenue and/or expense.

12. The method of claim 1, further comprising:
upon determining that a utilization rate of the at least one computational resource supporting the selected first one of the desktop pools exceeds a predetermined threshold, selecting at least one new desktop pool to be provisioned for additionally allocating the at least one computational resource; and
provisioning the selected at least one new desktop pool.

13. The method of claim 12, further comprising:
determining at least one of a revenue or an expense associated with each of a plurality of new desktop pools; and
selecting the at least one new desktop pool to be provisioned based at least in part on the associated revenue and/or expense.

14. The method of claim 1, further comprising upon determining that a utilization rate of the at least one computational resource supporting the selected first one of the desktop pools exceeds a predetermined threshold, resizing a viewpod in the VDI to provide at least one additional desktop pool.

15. The method of claim 1, further comprising upon determining that a utilization rate of the at least one computational resource supporting the selected first one of the desktop pools is below a predetermined threshold, suspending or terminating the first one of the desktop pools.

16. The method of claim 1, wherein the at least one computational resource comprises at least one of a CPU, a memory or a storage supporting the desktop pools.

17. A computer system for managing at least one computational resource in a virtual desktop infrastructure (VDI) comprising a plurality of desktop pools,
at least one processing unit;
at least one memory storage component;
a VDI management system, configured to;
define a plurality of time slots, each time slot having a start time and an end time;
for a user utilizing a desktop resource supported by the at least one computational resource in the plurality of desktop pools, learn, by an analysis module of the VDI management system, a user-specific utilization pattern associated with the at least one computational resource in at least one of the time slots;
upon receiving a user's request for the desktop resource, select, by a pool management module of the VDI management system, a first one of the desktop pools in the VDI based at least in part on the learned user-specific utilization patterns and time associated with the user's request, wherein a utilization rate of the at least one computational resource supporting the selected first one of the desktop pools is smaller than that of the at least one computational resource supporting any of the unselected desktop pools;

allocate, by an allocation module of the VDI management system, the at least one computational resource from the selected first one of the desktop pools to the user; and execute, for the desktop resource, the at least one computational resource from the selected first one of the desktop pools in response to the allocating.

18. The computer system of claim 17, wherein the VDI management system is further configured to identify one of the time slots to which the time associated with the user's request belongs, the first one of the desktop pools being selected further based at least in part on the learned user-specific utilization patterns in the identified time slot.

19. The computer system of claim 18, wherein the VDI management system is further configured to, upon receiving the user's request, predict a user utilization demand on the desktop resource supported by the at least one computational resource in the identified time slot, the first one of the desktop pools being selected further based at least in part on the predicted user utilization demand.

20. The computer system of claim 17, wherein each of the plurality of desktop pools offers a price for providing the at least one computational resource to support the desktop resource, the price offered by the selected first one of the desktop pools being smaller than the prices offered by the unselected desktop pools.

21. The computer system of claim 17, wherein each user-specific utilization pattern is learned by collecting and analyzing a plurality of utilization records associated with the user utilizing the desktop resource supported by the at least one computational resource over a predetermined time.

22. The computer system of claim 21, wherein the learned user-specific utilization pattern in each of the time slots is determined based on an average of the utilization records over a predetermined period of time in each of the time slots.

23. The computer system of claim 17, wherein the VDI management system is further configured to:
classify the learned user-specific utilization patterns in each of the time slots into a plurality of regions; and
upon receiving the user's request, identify a user's region, wherein the first one of the desktop pools is selected further based at least in part on the learned user-specific utilization patterns classified in the user's region.

24. The computer system of claim 17, wherein the VDI management system is further configured to:
upon determining that a utilization rate of the at least one computational resource supporting the selected first one of the desktop pools exceeds a predetermined threshold, select a second one, different from the first one, of the desktop pools; and
allocate the at least one computational resource from the selected second one of the desktop pools to the user.

25. The computer system of claim 24, wherein the utilization rate of the at least one computational resource supporting the selected second one of the desktop pools is below the predetermined threshold.

26. The computer system of claim 17, wherein the VDI management system is further configured to:
upon determining that a utilization rate of the at least one computational resource supporting the selected first one of the desktop pools exceeds a predetermined threshold, select at least one of the plurality of desktop pools to be cloned for additionally allocating the at least one computational resource; and
clone the selected at least one of the desktop pools.

27. The computer system of claim 26, wherein the VDI management system is further configured to:
determine at least one of a revenue or an expense associated with each of the plurality of the desktop pools; and
select the at least one of the plurality of desktop pools to be cloned based at least in part on the associated revenue and/or expense.

28. The computer system of claim 17, wherein the VDI management system is further configured to:
upon determining that a utilization rate of the at least one computational resource supporting the selected first one of the desktop pools exceeds a predetermined threshold, select at least one new desktop pool to be provisioned for additionally allocating the at least one computational resource; and
provision the selected at least one new desktop pool.

29. The computer system of claim 28, wherein the VDI management system is further configured to:
determine at least one of a revenue or an expense associated with each of a plurality of new desktop pools; and
select the at least one new desktop pool to be provisioned based at least in part on the associated revenue and/or expense.

30. The computer system of claim 17, wherein the VDI management system is further configured to, upon determining that a utilization rate of the at least one computational resource supporting the selected first one of the desktop pools exceeds a predetermined threshold, resize a viewpod in the VDI to provide at least one additional desktop pool.

31. The computer system of claim 17, wherein the VDI management system is further configured to, upon determining that a utilization rate of the at least one computational resource supporting the selected first one of the desktop pools is below a predetermined threshold, suspend or terminate the first one of the desktop pools.

32. The computer system of claim 17, wherein the at least one computational resource comprises at least one of a CPU, a memory or a storage supporting the desktop pools.

* * * * *